US008624999B2

(12) United States Patent
Ishigaki et al.

(10) Patent No.: US 8,624,999 B2
(45) Date of Patent: Jan. 7, 2014

(54) IMAGING APPARATUS

(75) Inventors: Tomoko Ishigaki, Yokohama (JP);
Ryosuke Kasahara, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 401 days.

(21) Appl. No.: 12/913,933

(22) Filed: Oct. 28, 2010

(65) Prior Publication Data

US 2011/0128408 A1    Jun. 2, 2011

(30) Foreign Application Priority Data

Dec. 1, 2009   (JP) .................................. 2009-273776
Dec. 14, 2009  (JP) .................................. 2009-282989
Sep. 10, 2010  (JP) .................................. 2010-203581

(51) Int. Cl.
*H04N 5/76*    (2006.01)
*H04N 5/225*   (2006.01)

(52) U.S. Cl.
USPC .................. 348/231.2; 348/220.1; 348/222.1; 386/125

(58) Field of Classification Search
USPC .......... 348/231.9, 231.2, 231.3, 231.7, 220.1, 348/222.1
See application file for complete search history.

(56) References Cited

U.S. PATENT DOCUMENTS

| 6,774,940 | B1* | 8/2004 | Ogura et al. ............. 348/231.99 |
| 7,053,946 | B2* | 5/2006 | Takahashi et al. ............ 348/294 |
| 2005/0264691 | A1* | 12/2005 | Endo et al. .................... 348/446 |
| 2009/0115882 | A1* | 5/2009 | Kawarada ..................... 348/340 |
| 2009/0135277 | A1 | 5/2009 | Kasahara |
| 2009/0190008 | A1 | 7/2009 | Kasahara |
| 2009/0190855 | A1 | 7/2009 | Kasahara |
| 2009/0195675 | A1* | 8/2009 | Haneda .................... 348/240.99 |
| 2009/0201417 | A1 | 8/2009 | Kasahara |
| 2009/0202171 | A1 | 8/2009 | Kasahara |
| 2009/0226086 | A1 | 9/2009 | Kasahara |
| 2009/0231416 | A1 | 9/2009 | Kasahara |
| 2009/0231472 | A1 | 9/2009 | Kasahara |
| 2009/0238455 | A1 | 9/2009 | Kasahara |
| 2010/0002105 | A1 | 1/2010 | Kasahara |

FOREIGN PATENT DOCUMENTS

| CN | 1082292 A | 2/1994 |
| CN | 1577040 A | 2/2005 |
| CN | 1705368 A | 12/2005 |
| JP | 2000-032355 A | 1/2000 |
| JP | 2005-275242 A | 10/2005 |
| JP | 2006-303621 A | 11/2006 |
| JP | 2009-181339 A | 8/2009 |

\* cited by examiner

*Primary Examiner* — Hung Lam
(74) *Attorney, Agent, or Firm* — Dickstein Shapiro LLP

(57) ABSTRACT

An imaging apparatus, including an optical system forming an image of an optical image of an object; an imaging element imaging the optical image and producing image data at a frame frequency Ffs out of a frame frequency Ffr of NTSC system; a frame memory storing the image data; and a controller progressively writing the image data in the frame memory and interlacedly reading out the image data from the frame memory at the frame frequency Ffr of NTSC system. The frame memory is divided into at least three areas comprising a writing-in area and a read-out area, wherein the controller sequentially switches the areas of the frame memory and progressively writes one frame of image data in each area and interlacedly reads out one frame of image data from each area in sequence.

16 Claims, 29 Drawing Sheets

FIG. 2
(a)
OUTPUT SIGNAL FROM IMAGING ELEMENT (PROGRESSIVE)
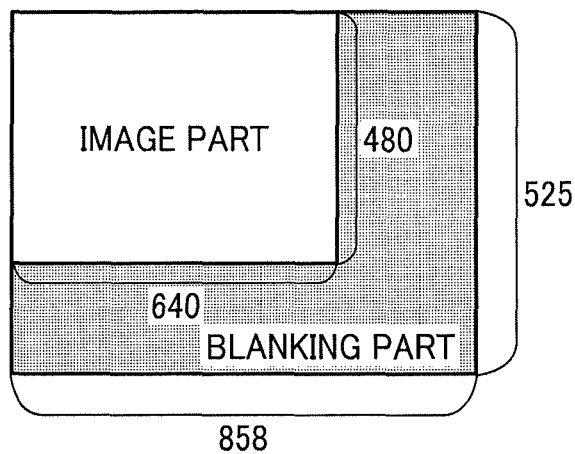
(b)
READ-OUT SIGNAL FROM FRAME MEMORY (INTERLACE)
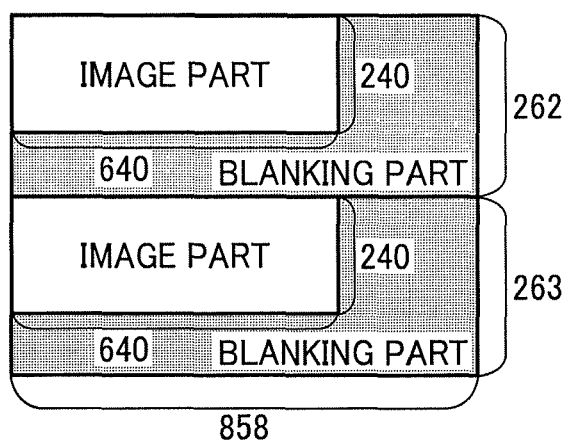

FIG. 3
(a)
OUTPUT SIGNAL FROM IMAGING ELEMENT (PROGRESSIVE)
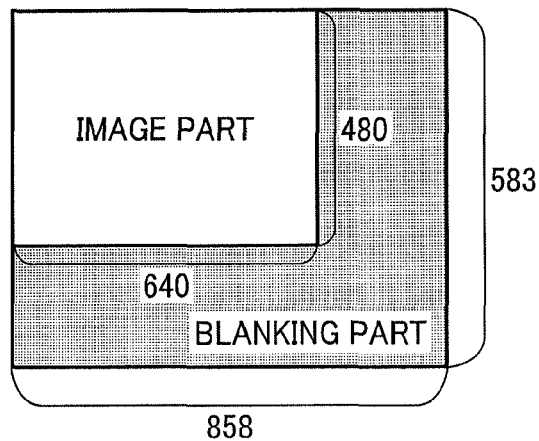
(b)
READ-OUT SIGNAL FROM FRAME MEMORY (INTERLACE)
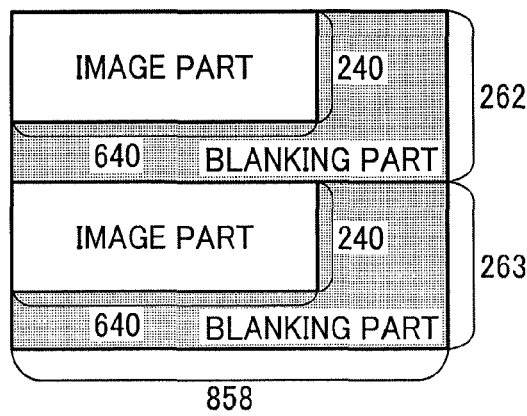

FIG. 4
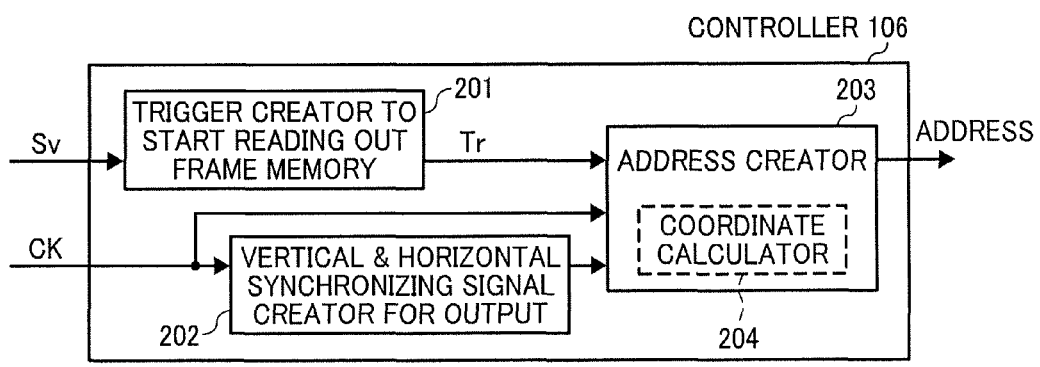
FIG. 5
(a)
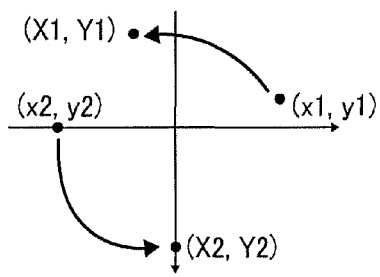
(b)
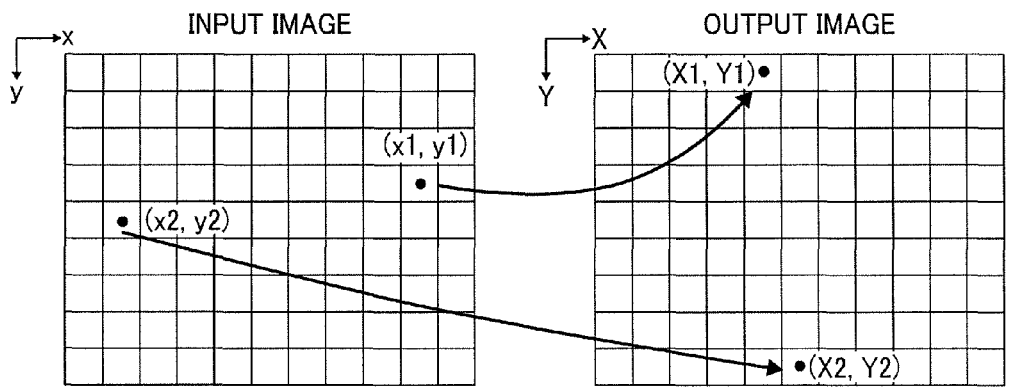

FIG. 14
(a)
FRAME FREQUENCY OF SENSOR
=OUTPUT FREQUENCY
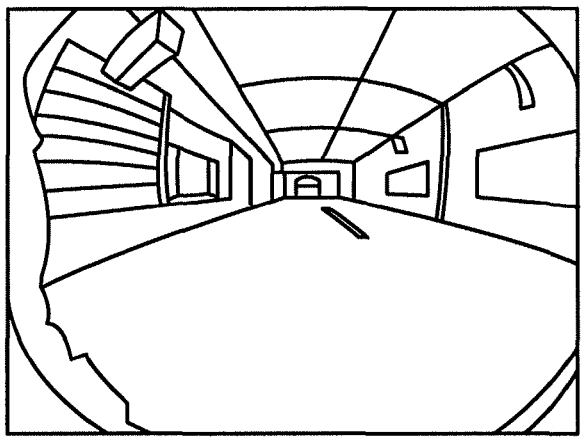
(b)
FRAME FREQUENCY OF SENSOR
IS SHIFTED
COMB NOISE GENERATES
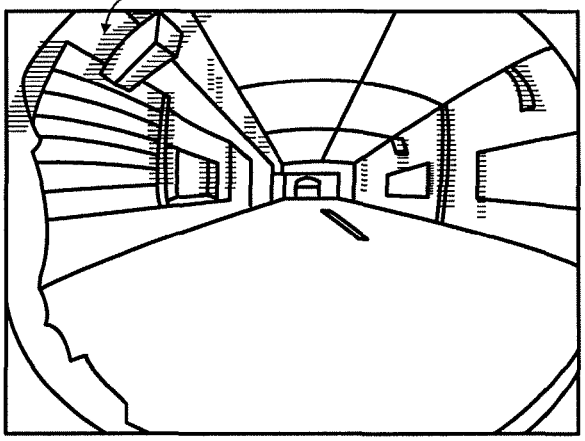

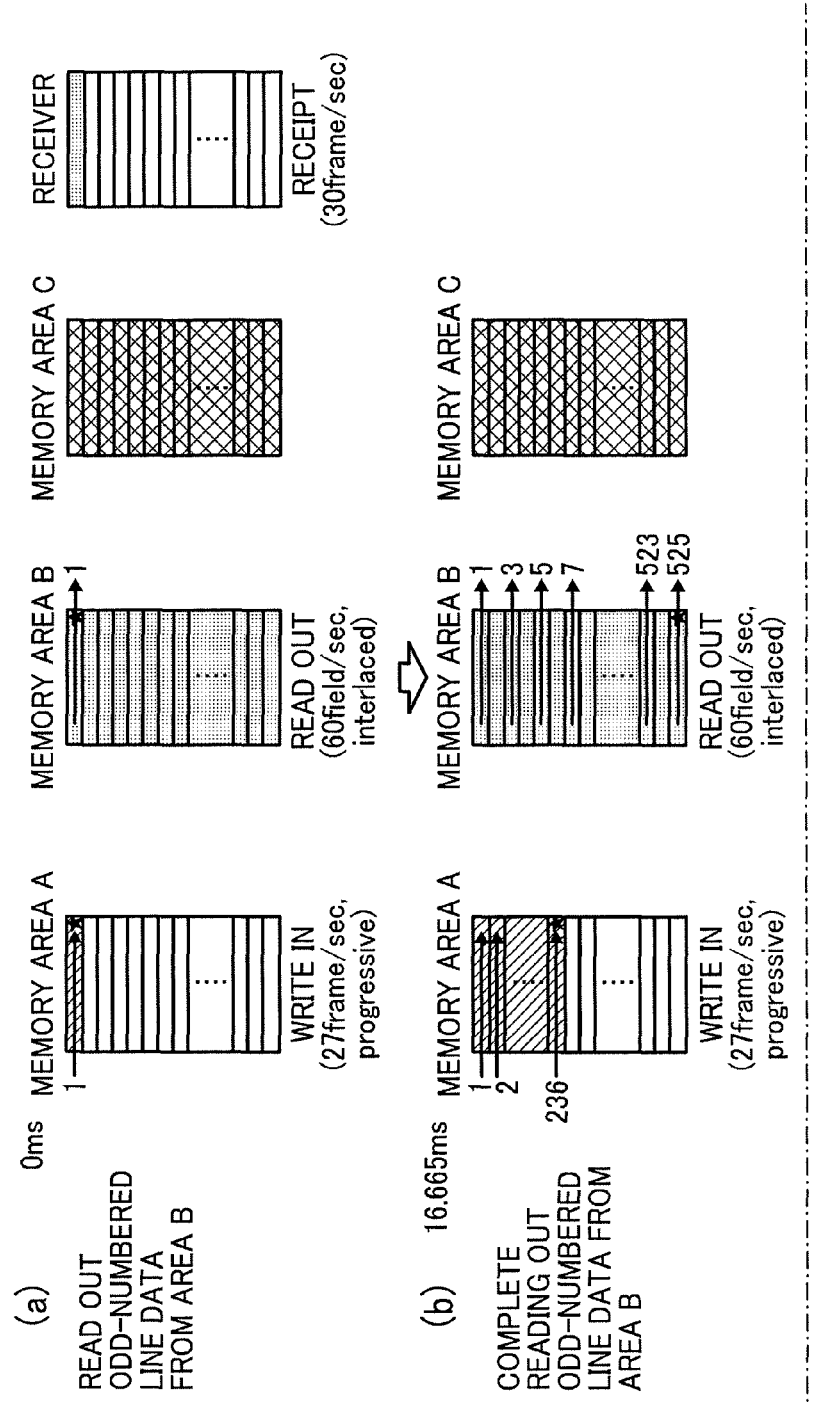

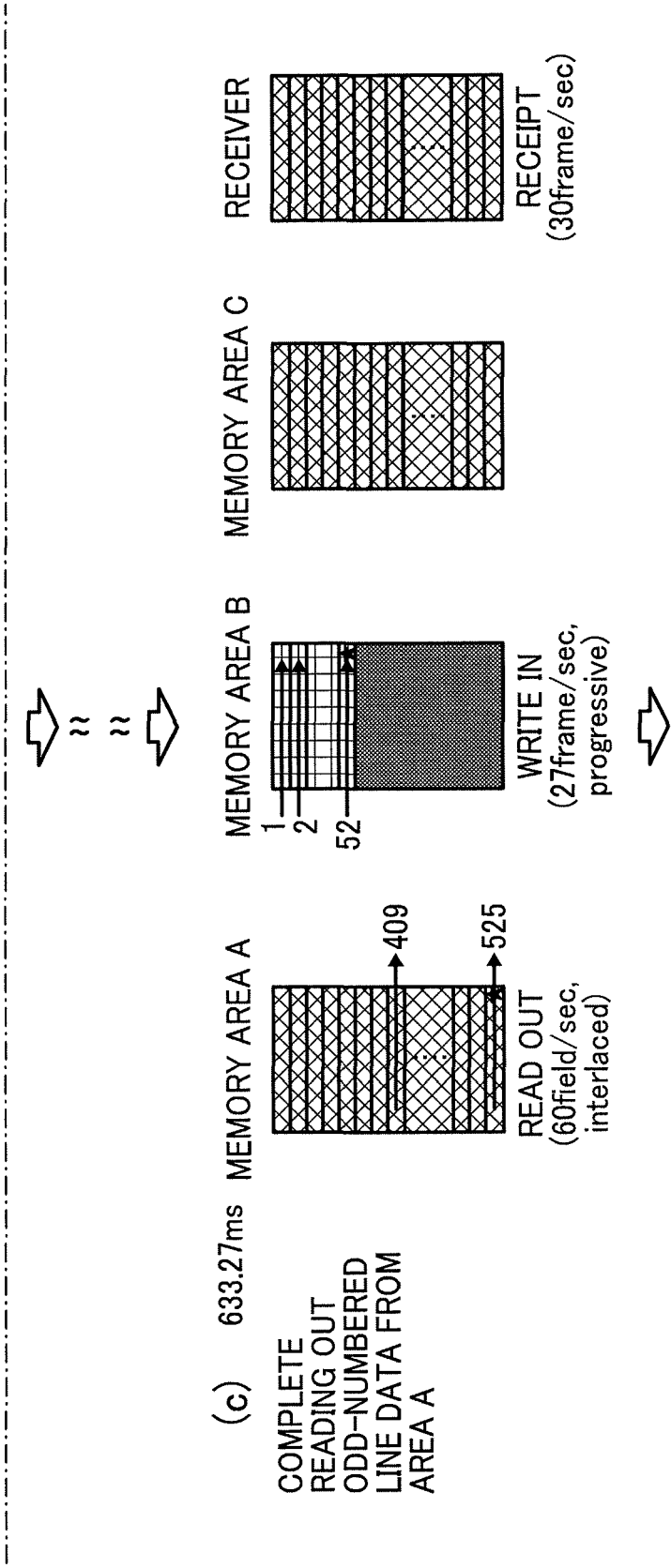

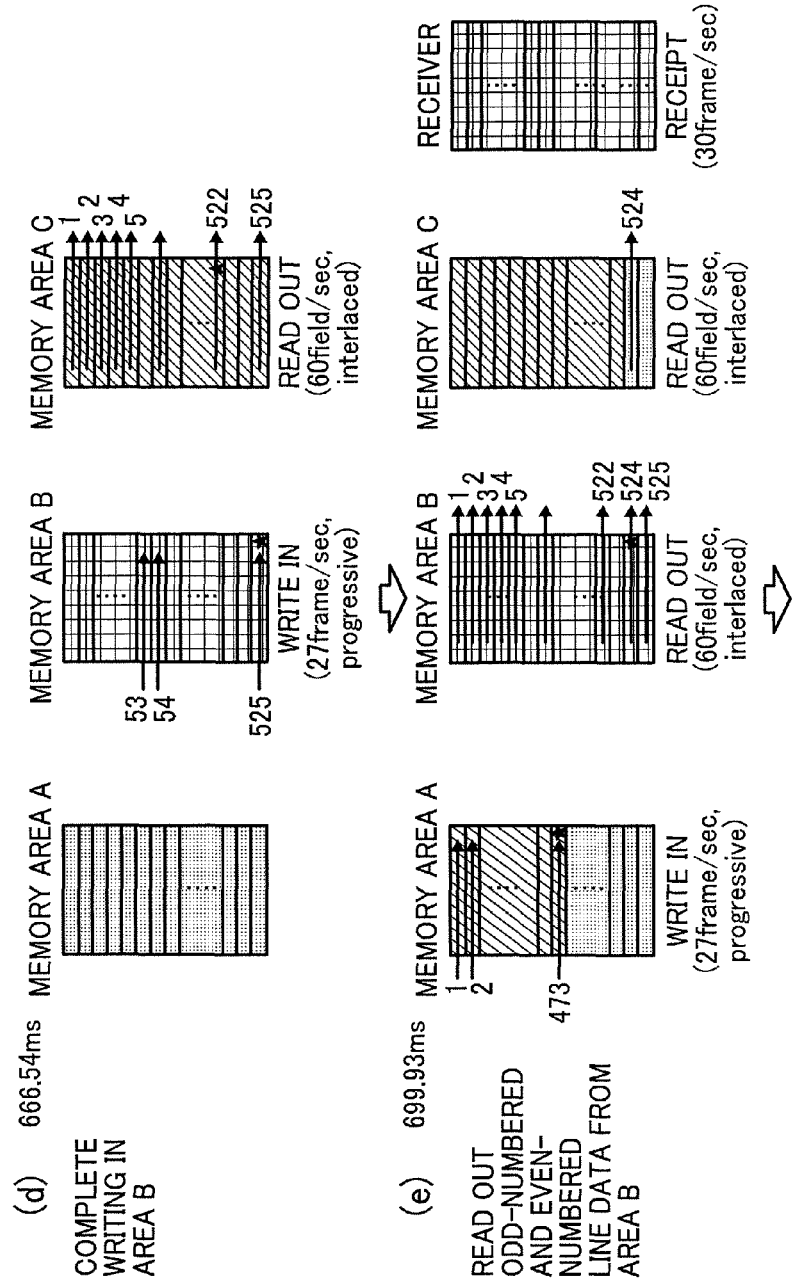

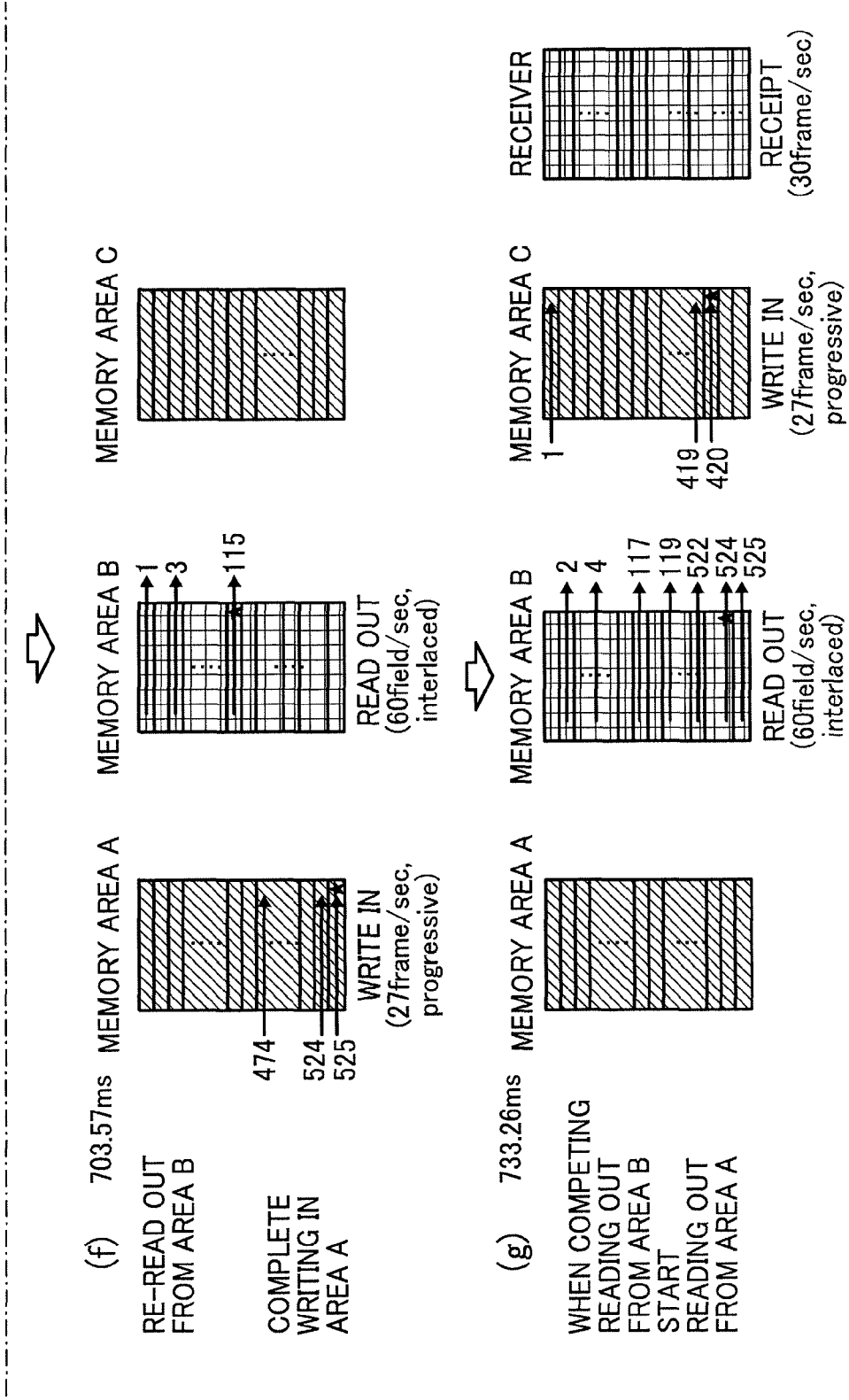

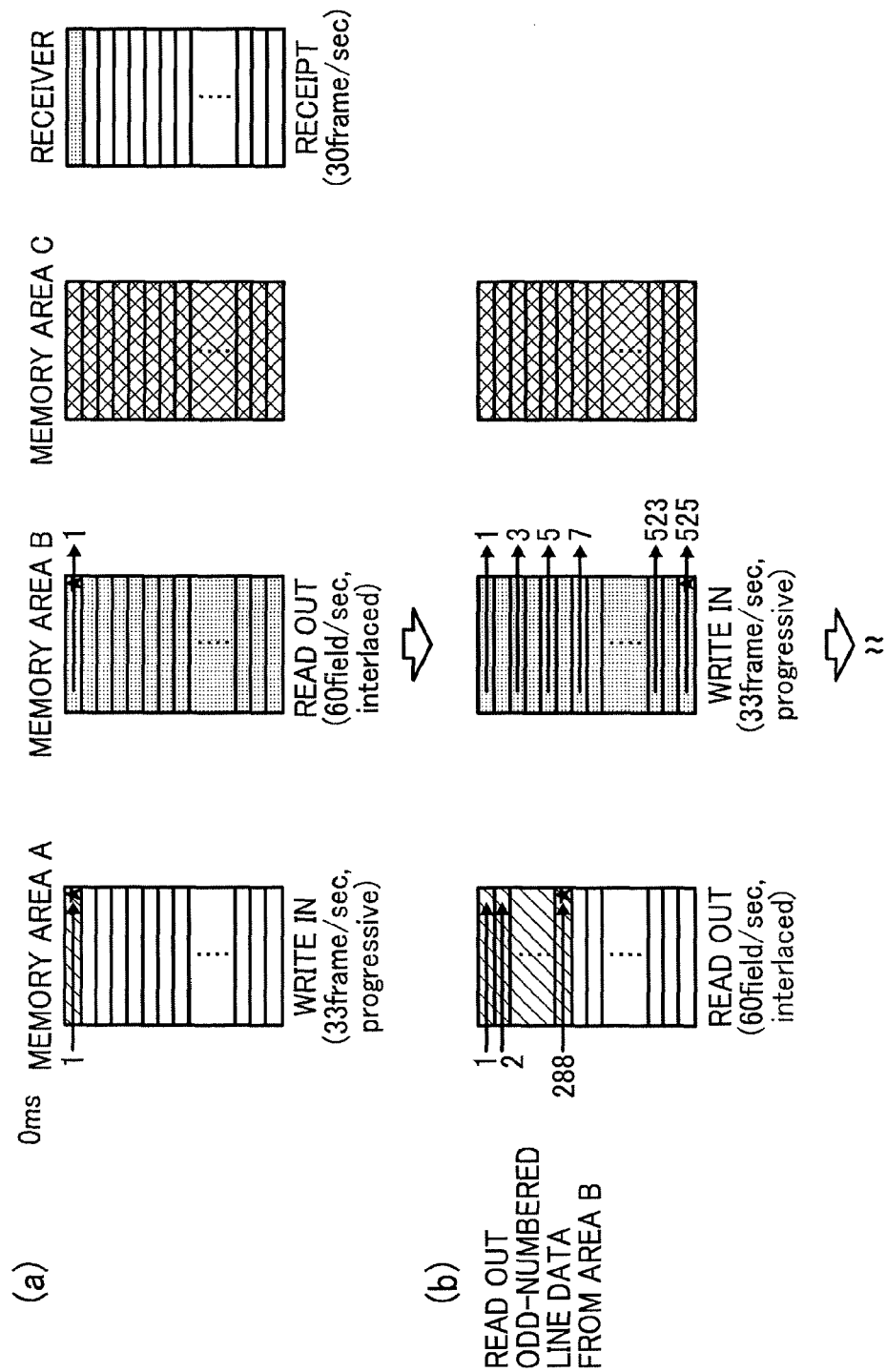

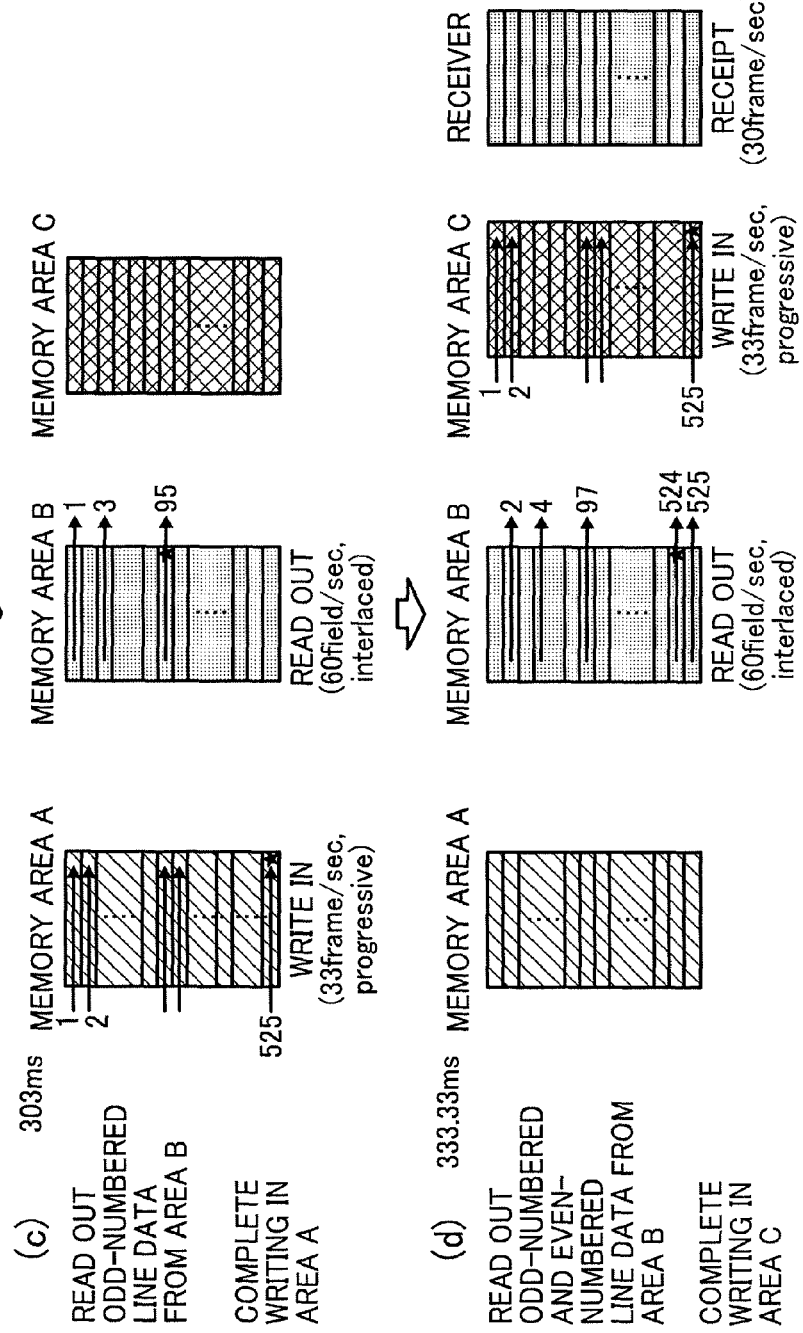

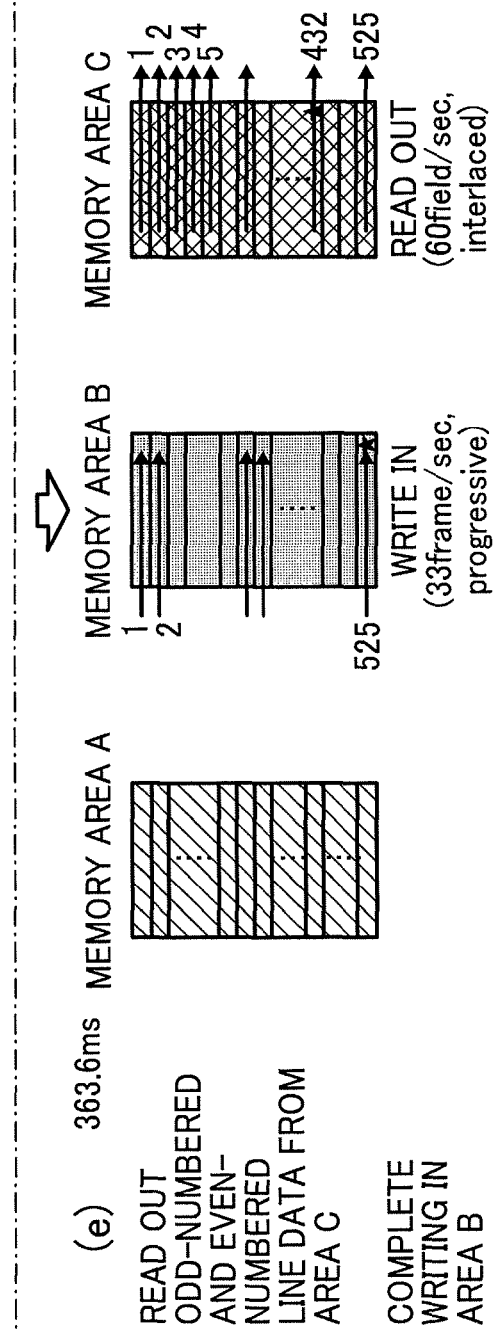

FIG. 22

TABLE OF TRUTH VALUE OF ADDRESS CALCULATOR

| i_write | i_xwe | action |
|---|---|---|
| 01 (A) | 0 | o_addr <= i_addr[18:0] |
| 10 (C) | 0 | o_addr <= i_addr[18:0]+20'd307201 |
| 00 (B) | 0 | o_addr <= i_addr[18:0]+20'd614402 |

| i_read | i_xwe | action |
|---|---|---|
| 01 (A) | 1 | o_addr <= i_addr[18:0] |
| 10 (C) | 1 | o_addr <= i_addr[18:0]+20'd307201 |
| 00 (B) | 1 | o_addr <= i_addr[18:0]+20'd614402 |

IMAGING APPARATUS

BACKGROUND OF THE INVENTION

1. Field of the Invention

The present invention relates to an imaging apparatus such as a car-mounted camera, and more particularly to an imaging apparatus using the NTSC system.

2. Description of the Background Art

To accommodate display devices using the NTSC system, car-mounted cameras typically take images at 30 fps with an imaging element such as a CMOS sensor. However, when a car-mounted camera takes an image of a display device such as an on-street LED traffic signal, the following problem occurs.

The LED traffic signal is driven by a drive voltage coming from a full-wave rectified commercial AC source. Therefore, the signal blinks on and off in an extremely short time cycle that is not visually recognizable. Thus, in a frame, when a charge accumulation time of the imaging element and a light-out period of the signal overlap, the signal appears to be out in the frame even though a red, blue or green light is actually on. When multiple such frames continue, dozens of image frames in each of which a signal in a light-out state is imaged are produced. This is a particularly serious problem for a drive recorder. The drive recorder records images taken by the car-mounted camera, and is widely used to analyze accidents. The true state of the signal when an accident occurs is important in determining liability for the accident.

In order to solve the problem, Japanese published unexamined application No. 2009-181339 (JP-2009-181339-A) discloses a method of offsetting a frame frequency of the imaging element by a predetermined frequency relative to a frame frequency of the NTSC system to set a frame frequency (offset frame frequency). When an LED signal is imaged, dozens of image frames in each of which a signal in a light-up or a light-out state is imaged are not produced. However, the frame frequency of an image signal is out of the frame frequency of the NTSC system, and cannot be displayed in a display device of the NTSC system.

In order to solve this problem, it is conceivable that image data taken from the imaging element be stored in a frame memory at a frame frequency (offset frame frequency) taken out of the frame frequency of the NTSC system, and read out from the frame memory at the frame frequency of the NTSC system to be produced in the display device. However, the following fresh problem then occurs.

The image data is typically read out from the imaging element by a progressive method, whereas the display device of the NTSC system uses an interlace method. Therefore, a time for writing one frame of image data in the frame memory and a time for reading out one frame of image data from the frame memory differ from each other, and a comb noise specific to the interlace method is made even when the frame memory is a double buffer. The comb noise is a pectinate image shift generated in a frame image formed of an odd-number field and an even-number field of a different frame.

For these reasons, a need exists for an imaging apparatus less susceptible to a blink cycle of lighting devices such as LED traffic signals, is capable of using display devices using the NTSC system, and can prevent occurrence of comb noise.

SUMMARY OF THE INVENTION

Accordingly, an object of the present invention is to provide an imaging apparatus less susceptible to a blink cycle of lighting devices such as LED traffic signals, capable of using display devices using the NTSC system, and preventing occurrence of comb noise.

Another object of the present invention is to provide a low-cost imaging apparatus capable of reading out image data from an imaging element at a frame frequency out of a frame frequency of the NTSC system using a simple configuration.

These objects and other objects of the present invention, either individually or collectively, have been satisfied by the discovery of an imaging apparatus, comprising:

an optical system configured to form an optical image of an object;

an imaging element configured to image the optical image and produce image data at a frame frequency Ffs out of a frame frequency Ffr of NTSC system;

a frame memory configured to store the image data; and a controller configured to progressively write the image data in the frame memory and interlacedly read out the image data from the frame memory at the frame frequency Ffr of NTSC system, wherein the frame memory is divided into at least three areas comprising a writing-in area and a read-out area, and wherein the controller sequentially switches the areas of the frame memory and progressively writes one frame of image data in each area and interlacedly reads out one frame of image data from each area in sequence.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIGS. 2A and 2B are diagrams showing a conventional relation between an output signal from an imaging element and a read-out signal from a frame memory;

FIGS. 3A and 3B are diagrams showing a relation between an output signal from an imaging element and a read-out signal from a frame memory of the present invention;

FIG. 4 is a detailed configuration of a controller in FIG. 1;

FIGS. 5A and 5B are diagrams showing a process image of coordinate calculation means in FIG. 4;

FIGS. 14(a) and 14(b) are specific examples of output images;

FIG. 17A is a diagram showing a transition of write-in and read-out and a status of an output image in the triple buffer (write-in time>read-out time);

FIG. 17B is a continuous diagram of FIG. 17A;

FIG. 19A is a diagram showing a transition of write-in and read-out and a status of an output image in the triple buffer (write-in time<read-out time);

FIG. 19B is a continuous diagram of FIG. 19A;

FIG. 22 is a table of truth value explaining an operation of an address calculator in FIG. 20.

DETAILED DESCRIPTION OF THE INVENTION

Figure 1:
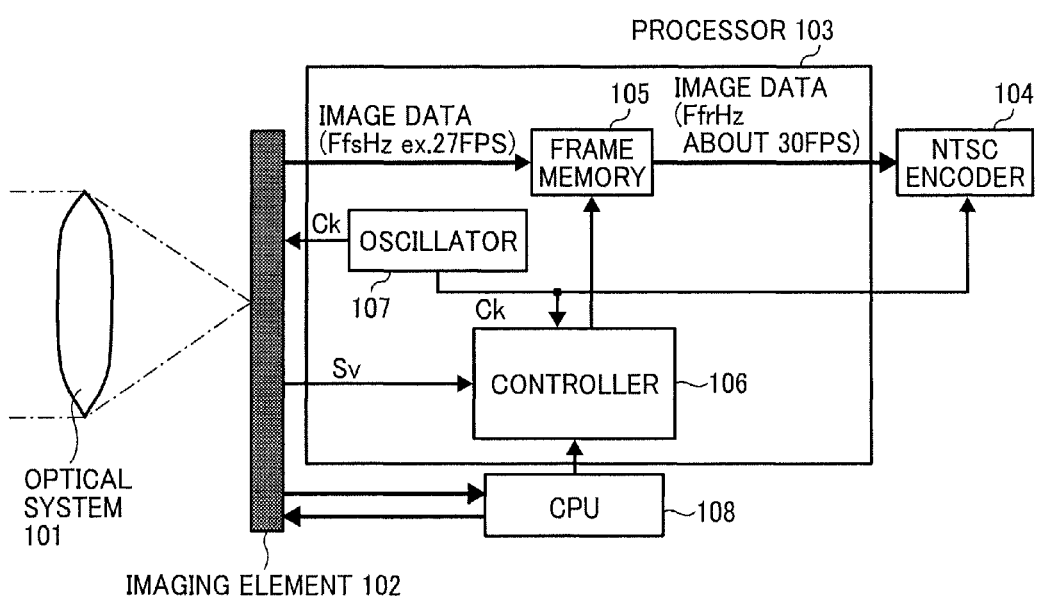
FIG. 1 is a whole configuration diagram of an embodiment of the imaging apparatus of the present invention.

The present invention provides an imaging apparatus less susceptible to a blink cycle of lighting devices such as LED traffic signals, capable of using display devices using the NTSC system, and preventing occurrence of comb noise. In addition, the present invention provides a low-cost imaging apparatus capable of reading out image data from an imaging element at a frame frequency out of a frame frequency of the NTSC system using a simple configuration.

Particularly, the present invention relates to an imaging apparatus, comprising:

an optical system configured to form an optical image of an object;

an imaging element configured to image the optical image and produce image data at a frame frequency Ffs out of a frame frequency Ffr of NTSC system;

a frame memory configured to store the image data; and a controller configured to progressively write the image data in the frame memory and interlacedly read out the image data from the frame memory at the frame frequency Ffr of NTSC system, wherein the frame memory is divided into at least three areas comprising a writing-in area and a read-out area, and wherein the controller sequentially switches the areas of the frame memory and progressively writes one frame of image data in each area and interlacedly reads out one frame of image data from each area in sequence.

Hereinafter, embodiments of the present invention will be explained, referring to the drawings.

FIG. 1 is a whole configuration diagram of an embodiment (Embodiment 1) of the imaging apparatus of the present invention. The imaging apparatus includes an optical system 101, an imaging element 102, a processor 103, an NTSC encoder 104, a CPU 108 controlling the all operations, etc. The processor 103 includes a frame memory 105, a controller 106 and an oscillator 107. The NTSC encoder 104 is connected with a display device and an image recorder of the NTSC system, but they are omitted in FIG. 1. The oscillator 107 is a crystal element generating a clock signal having a frequency of 13.5 MHz for the NTSC system. The oscillator 107 gives a clock (CK) to the controller 106, the NTSC encoder 104, and further to the imaging element 102 as well in the processor 103.

The imaging element 102 receives a clock having a frequency of 13.5 MHz for the NTSC system from the oscillator 107, progressively reads out image data imaged through the optical system 101 at a frame frequency Ffs, e.g., 27 FPS which is offset by a predetermined off set frequency relative to a frame frequency Ffr (about 30 FPS) of the NTSC system, and transmits the image data to the processor 103. Specifically, the imaging element 102 has a register (sensor register) and changes a blanking period in a vertical direction or a blanking period in a horizontal direction according to a parameter value set by the CPU 108 in the register such that the frame frequency of image data becomes Ffs, e.g., 27 FPS. The imaging element 102 transmits a frame synchronizing signal Sv of the frame frequency Ffs to the processor 103 as well as the image data.

The image data produced from the imaging element 102 is progressively written in the frame memory 105 in the processor 103 in sequence at a timing of the frame frequency Ffs, e.g., 27 FPS. The image data written in the frame memory 105 is interlacedly read out in sequence at a timing of the frame frequency Ffr (about 30 FPS) of the NTSC system under control of the controller 106. The controller 106 designates a read-out address relative to the frame memory 105 and controls the read-out timing of the frame memory 105 based on the frame synchronizing signal Sv from the imaging element 102. In addition, the controller 106 receives a clock having a frequency of 13.5 MHz for the NTSC system from the oscillator 107 and controls the interlaced read-out at a timing of the frame frequency Ffr of THE NTSC system. The configuration of the controller 106 will be mentioned later.

The image data read out from the frame memory 105 is subjected to a digital-analog conversion by the NTSC encoder 104 to be converted into an image signal of the NTSC system, and which is transmitted to a display device or a recorder (not shown).

As FIG. 1 shows, image data are taken from the imaging element 102 at a frame frequency which is offset by a predetermined offset frequency relative to a frame frequency Ffr of the NTSC system, written in the frame memory 105 (progressive), and read out at the frame frequency Ffr of the NTSC system (interleave) from the frame memory. Therefore, an imaging apparatus less susceptible to a blink cycle of lighting devices such as LED traffic signals, capable of using display devices using the NTSC system can be provided. Methods of preventing comb noise will be mentioned later.

The imaging element 102 receives a clock (CK) having a frequency for the NTSC system from the oscillator 107 mounted in the processor 103, and produces image data having a frame frequency Ffs out of a frame frequency Ffr of the NTSC system. Therefore, an additional oscillator for the frame frequency Ffs is not needed, and a low-cost imaging apparatus can be provided. Hereinafter, this will be explained in detail.

FIGS. 2A and 2B are diagrams showing a conventional relation between an output signal from an imaging element and a read-out signal from a frame memory. FIG. 2A is an output signal (progressive) from an imaging element, and FIG. 2B is a read-out signal (interlace) from a frame memory. Namely, conventionally, an output signal from an imaging element and a read-out signal from a frame memory have the same blanking period in a vertical direction in accordance with the NTSC system. Therefore, in order to make image data produced from the imaging element have a frame frequency Ffs which is out of a frame frequency Ffr of the NTSC system, besides an oscillator (13.5 MHz) generating a clock signal for the NTSC system to read out image data from a frame memory, an oscillator having a different clock frequency (such as 12.2 MHz) is needed to read out image data from an imaging element. The present invention does not need such an oscillator.

FIGS. 3A and 3B are diagrams showing a relation between an output signal from an imaging element and a read-out signal from a frame memory of the present invention. FIG. 3A is an output signal (progressive) from an imaging element, and FIG. 3B is a read-out signal (interlace) from a frame memory. The read-out signal from the frame memory is the same as that of FIG. 2B. Meanwhile, a blanking period in a vertical direction of the output signal from the imaging element is changed. Namely, image data from an imaging element 102 and a frame memory 105 are read out with a same clock (13.5 MHz) from an oscillator 107 generating a clock signal for the NTSC system. Then, a blanking period in a vertical direction of reading out image data l from the imaging element 102 is changed to make the image data produced from the imaging element 102 have a frame frequency Ffs which is out of a frame frequency Ffr of the NTSC system. As mentioned before, the imaging element 102 has a register (sensor register) and changes the blanking period in a vertical direction in accordance with a parameter value set in the register by a CPU 108. In FIG. 3, Ffs is smaller than Ffr, but Ffs may be larger than Ffr by changing the parameter value in the register. The CPU 108 sequentially changes the parameter value in the register to make frame frequencies adjacent to each other inconstant and average them so that the frame frequency Ffr of the NTSC system can drive an imaging element as mentioned later.

In FIG. 3, a blanking period in a vertical direction of reading out of image data from the imaging element 102 is changed. A blanking period in a horizontal direction or blanking periods in both of the vertical direction and the horizontal direction may be changed such that the image data from the imaging element 102 has a frame frequency Ffs which is out of a frame frequency Ffr of the NTSC system.

Next, the structural operation of the controller 106 will be explained. FIG. 4 is a detailed configuration of the controller 106. The controller 106 includes a trigger creator 201 initiating reading out frame memory, a vertical and horizontal synchronizing signal creator 202 for output and an address creator 203. The address creator 203 may include a coordinate calculator 204 for distortion correction and viewpoint conversion.

The trigger creator 201 initiating reading out frame memory receives a vertical synchronizing signal Sv from the imaging element 102, and operates as follows right after power-on of the imaging apparatus. The imaging element 102 is supposed to progressively readout. One Sv is passed on right after power-on of the imaging apparatus, and the second Sv asserts (effects) a trigger (Tr) initiating reading out frame memory.

Thus, when the frame memory 105 has no image data, image data cannot be read out from the frame memory 105.

The vertical and horizontal synchronizing signal creator 202 for output creates a vertical synchronizing signal and a horizontal synchronizing signal such that image read-out from the frame memory 105 has a frame frequency Ffr (about 30 FPS) with a clock having a clock frequency (13.5 MHz) of the NTSC system from the oscillator 107.

The address creator 203 sequentially designates read-out address of the frame memory 105 based on a clock (CK) from the oscillator 107 and the vertical synchronizing signal and the horizontal synchronizing signal from the vertical and horizontal synchronizing signal creator 202 for output, and reads out image data written in the frame memory 105 at a timing of a frame frequency Ffr (about 30 FPS) of the NTSC system. The address creator 203 does not sequentially designate read-out address of the frame memory 105, and may include a coordinate calculator 204 designating in accordance with a coordinate conversion rule, e.g., distortion correction, viewpoint conversion such as bird's-eye view, center cutout conversion, side cutout conversion and triple mirror conversion.

FIGS. 5A and 5B are diagrams showing a process image of the coordinate calculator 204. This shows an example producing a rotationally-deformed image at an angle of 90° of image data (input image) from the imaging element. FIG. 5A shows a positional relation between two pixels on the coordinate before and after converted. FIG. 5B shows a positional relation between the correspondent pixels on an input image and an output image memorized in the frame memory 105.

The coordinate calculator 204 calculates a read-out address such that pixel data of a coordinate (x1, y1) on the input image are readout as pixel data of a coordinate (X1, Y1) on the output image when reading out image data from the frame memory 105. In addition, the coordinate calculator 204 calculates a read-out address such that pixel data of a coordinate (x2, y2) on the input image are read out as pixel data of a coordinate (X2, Y2) on the output image. Based on this read-out address, image data are read out from a correspondent address of the frame memory 105 to form a rotationally-deformed image at an angle of 90° of input image as an output image.

Similarly, a fisheye view is deformed to correct image distortion thereof, and image deformation based on viewpoint conversion can form an image seen from directly above. In back monitor monitoring back of a car, an easily viewable image for a driver can be displayed. Various configurations and process algorisms of the coordinate calculator 204 are conventionally known, and detailed explanations thereof are omitted.

Next, improvement of a blink cycle of an illuminator such as LED traffic signals when image data are read out from the imaging element 102 at a frame frequency which is offset by a predetermined offset frequency (offset frame frequency) Ffs relative to a frame frequency Ffr of the NTSC system will be specifically explained.

Figure 6:
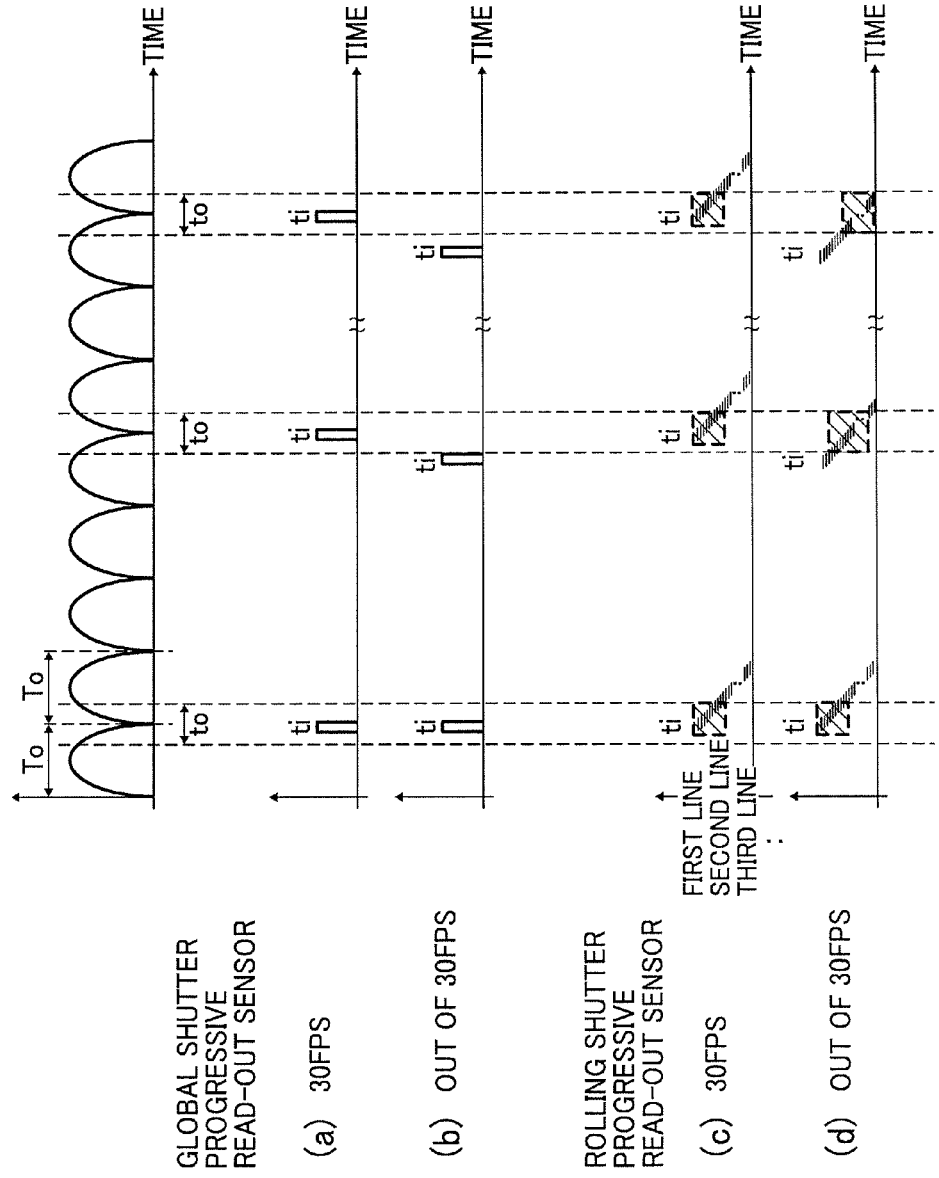
FIG. 6 is a diagram showing a timing of an illumination light turning on and off at a cycle of T and an exposure of an imaging element.
Figure 7:
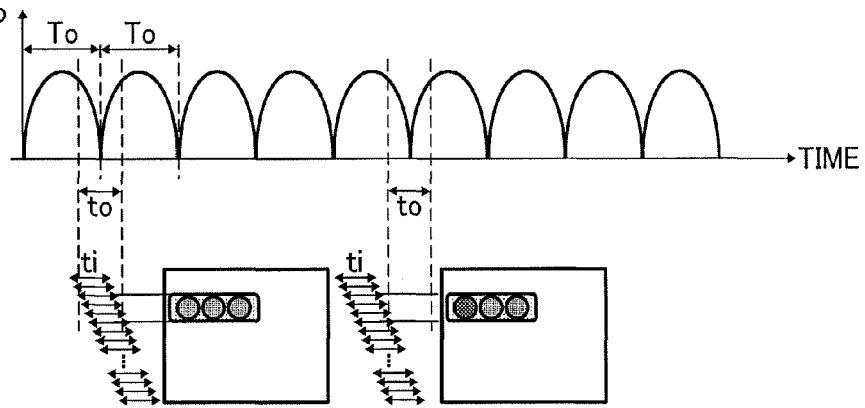
FIG. 7 is a diagram showing how a traffic signal is viewed at a timing of an illumination light turning on and off at a cycle of T and an exposure of an imaging element of a rolling shutter.

In FIGS. 6 and 7, a frame sampling cycle is a constant cycle out of the NTSC system. In this case, the sensor register in the imaging element 102 has a constant parameter value. In FIG. 6, the uppermost diagram shows light quantity variation of an illuminator blinking at a cycle $T_o$ such as a traffic signal of 60 Hz. The convex part of the diagram is the brightest status, and the valley is a dark status. A Lights-out period is $t_o$.

In FIG. 6, (a) and (b) show a timing of an exposure of an imaging element progressively read out with a global shutter. $t_i$ an exposure time. (a) is a case where the imaging element is driven at 30 FPS and (b) is a case where the imaging element is driven at a frequency out of 30 FPS. Since FIG. 6 (a) almost synchronizes at a frame frequency Ffr (29.97 Hz) of the NTSC system, illumination light in dark status is continuously imaged for a few seconds when the exposure enters a timing of dark status of the illumination light. Meanwhile, since FIG. 6 (b) does not synchronize at a frame frequency Ffr of the NTSC system, illumination light in dark status is not continuously imaged for a few seconds even when the exposure enters a timing of dark status of the illumination light because the exposure can easily escape from the dark status.

A rolling shutter is similar to this. In FIG. 6, (c) and (d) show a timing of an exposure of an imaging element progressively read out with a rolling shutter. $t_i$ an exposure time. Different from the global shutter, the rolling shutter independently expose each line. In FIG. 6, (c) and (d) show that the exposure time is gradually becoming longer, e.g., a first line, a second line, a third line. (c) is a case where the imaging element is driven at 30 FPS, and (d) is out of 30 FPS. The exposed line in the shaded area is imaged as a dark status when the line reflects blinking illumination light. In the case of (c), almost synchronizing at a frame frequency Ffr (29.97 Hz) of the NTSC system, illumination light in dark status is continuously imaged for a few seconds when the exposure enters a timing of dark status of the illumination light. Meanwhile, (d) does not synchronize at a frame frequency Ffr of the NTSC system, illumination light in dark status is not continuously imaged for a few seconds even when the exposure enters a timing of dark status of the illumination light because the exposure can easily escape from the dark status.

FIG. 7 shows illumination light blinking at a cycle of $T_0$, and how a traffic signal is reflected at an exposure timing of an imaging element progressively reading out by rolling shutter. At the left side of FIG. 7, since the exposure enters a dark timing of illumination light, the color of the traffic signal is not imaged. At the right side thereof, since the exposure is out of a dark timing of illumination light, the color of the traffic signal (such as blue) is imaged.

Figure 8:
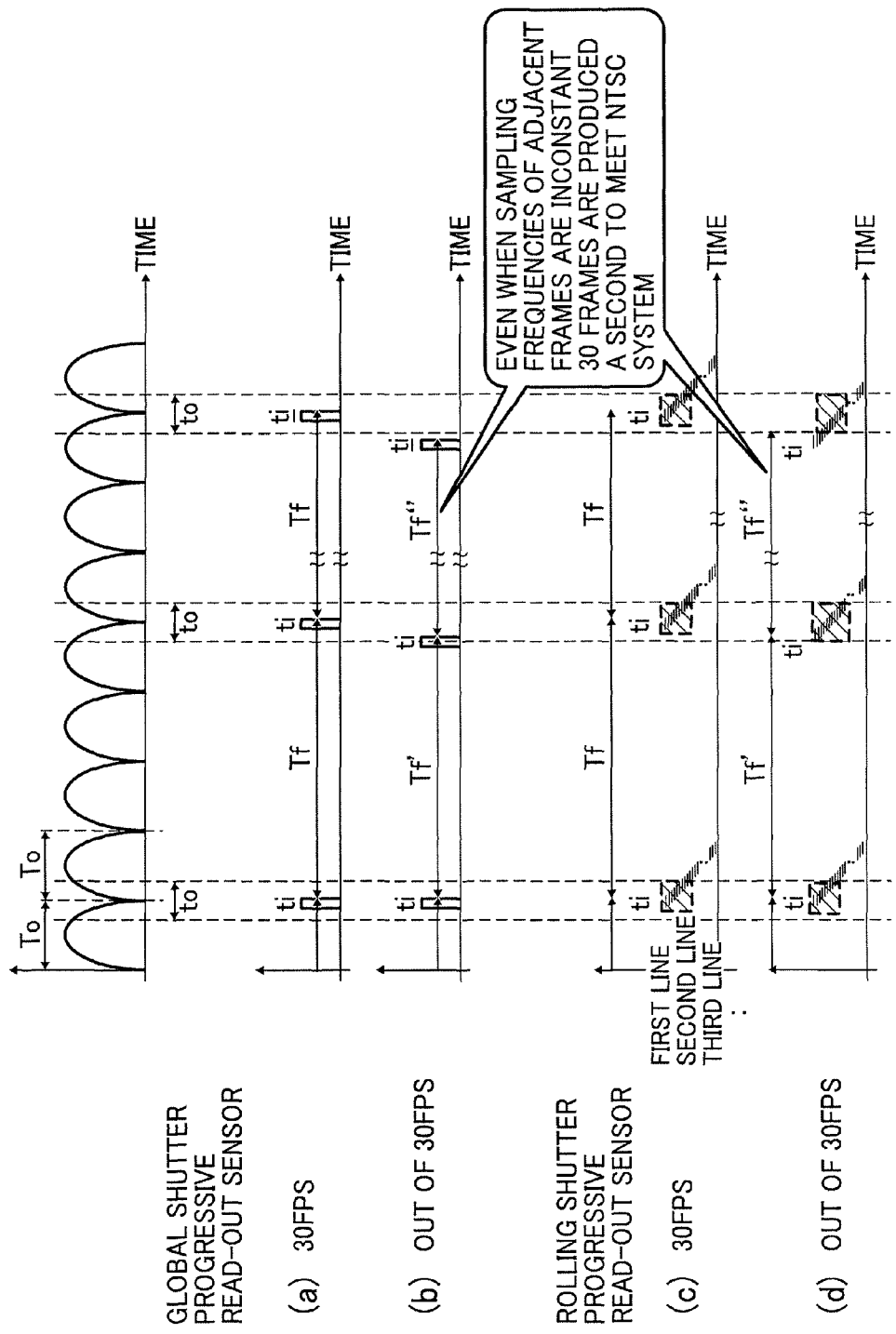
FIG. 8 is another diagram showing a timing of an illumination light turning on and off at a cycle of T and an exposure of an imaging element.

Next, FIG. 8 shows a case where sampling cycles of adjacent frames are inconstant and averaged for the NTSC system (30 frames a sec). In this case, the parameter value of the sensor register in the imaging element 102 varies per frame.

The uppermost diagram in FIG. 8 shows light quantity variation of an illuminator blinking at a cycle $T_o$ such as a traffic signal of 60 Hz as FIG. 6 does. The convex part of the diagram is the brightest status, and the valley is a dark status. A Lights-out period is $t_o$.

In (a) to (d) of FIG. 8, ti is an exposure time, and Tf, Tf' and Tf" are sampling cycles. Tf is a sample cycle of the NTSC system, and Tf' and Tf" are cycles shifted to a shorter time side or a longer time side. However, 30 frames can be produced a sec for the NTSC system.

(a) and (b) in FIG. 8 show exposure timings of imaging element progressively reading out by a global shutter. (a) is a case where an imaging element is driven at a constant sampling cycle (Tf), and (b) is a case where an imaging element is driven at an inconstant sampling cycle such as Tf' and Tf". In (a), illumination light in dark status is continuously imaged for a few seconds when the exposure enters a timing of dark status of the illumination light. In (b), illumination light in dark status is not continuously imaged for a few seconds even when the exposure enters a timing of dark status of the illumination light because the exposure can easily escape from the dark status. In addition, sampling cycles of adjacent frames are inconstant and averaged to produce 30 frames a sec for the NTSC system.

A rolling shutter is similar to this. In FIG. 8, (c) and (d) show a timing of an exposure of an imaging element progressively read out with a rolling shutter. Different from the global shutter, the rolling shutter independently expose each line. In FIG. 8, (c) and (d) show that the exposure time is gradually becoming longer, e.g., a first line, a second line, a third line as in FIG. 6. The exposed line in the shaded area is imaged as a dark status when the line reflects blinking illumination light. (c) is a case where an imaging element is driven at a constant sampling cycle (Tf), and (d) is a case where an imaging element is driven at an inconstant sampling cycle such as Tf' and Tf". In (c), illumination light in dark status is continuously imaged for a few seconds when the exposure enters a timing of dark status of the illumination light. In (d), illumination light in dark status is not continuously imaged for a few seconds even when the exposure enters a timing of dark status of the illumination light because the exposure can easily escape from the dark status. In addition, sampling cycles of adjacent frames are inconstant and averaged to produce 30 frames a sec for the NTSC system.

Image data progressively read out from the imaging element 102 at a frame frequency Ffs out of a frame frequency Ffr of the NTSC system is progressively written in the frame memory 105 as it is and interlacedly read out from the frame memory 105 at the frame frequency of the NTSC system. Thus, a display device and an image recorder of the NTSC system can be used as they are. However, since a time for writing one frame of image data in the frame memory 105 and a time for reading out one frame of image data therefrom are different from each other, a comb noise specific to the interlace system generates. Hereinafter, this will specifically be explained.

First, a case where progressive writing is made in the frame memory 105 at a frame frequency Ffr of the NTSC system, and interlaced reading out is made therefrom at the same frame frequency Ffr of the NTSC system will be explained. In this case, the frame memory 105 is divided at least 2 areas such as an area A and an area B (double buffer), which are a write-in area and a read-out area, and switched over to each other not to generate a comb noise.

Figure 9A:
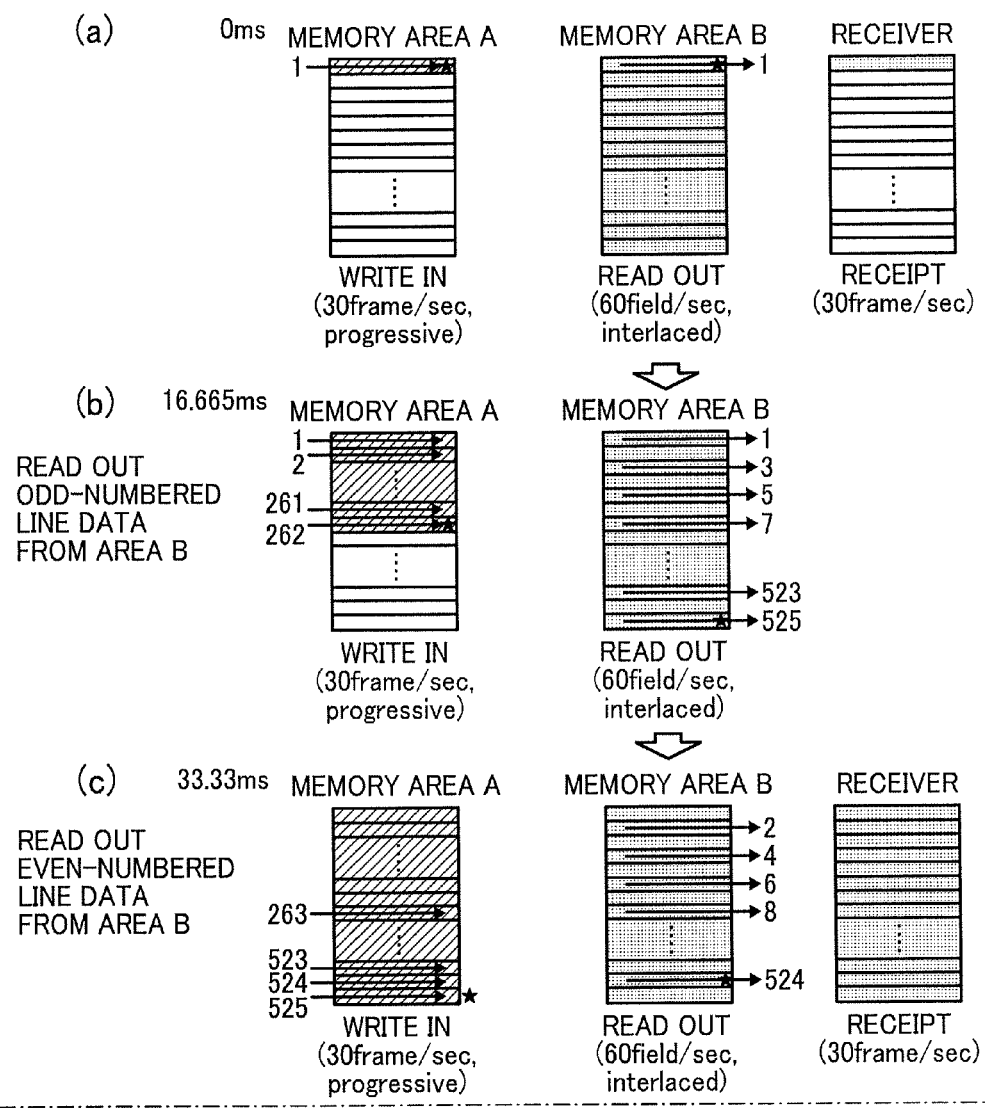
FIG. 9 is a diagram showing a transition of write-in and read-out and a status of an output image in a conventional double buffer (write-in time=read-out time)
Figure 9B:
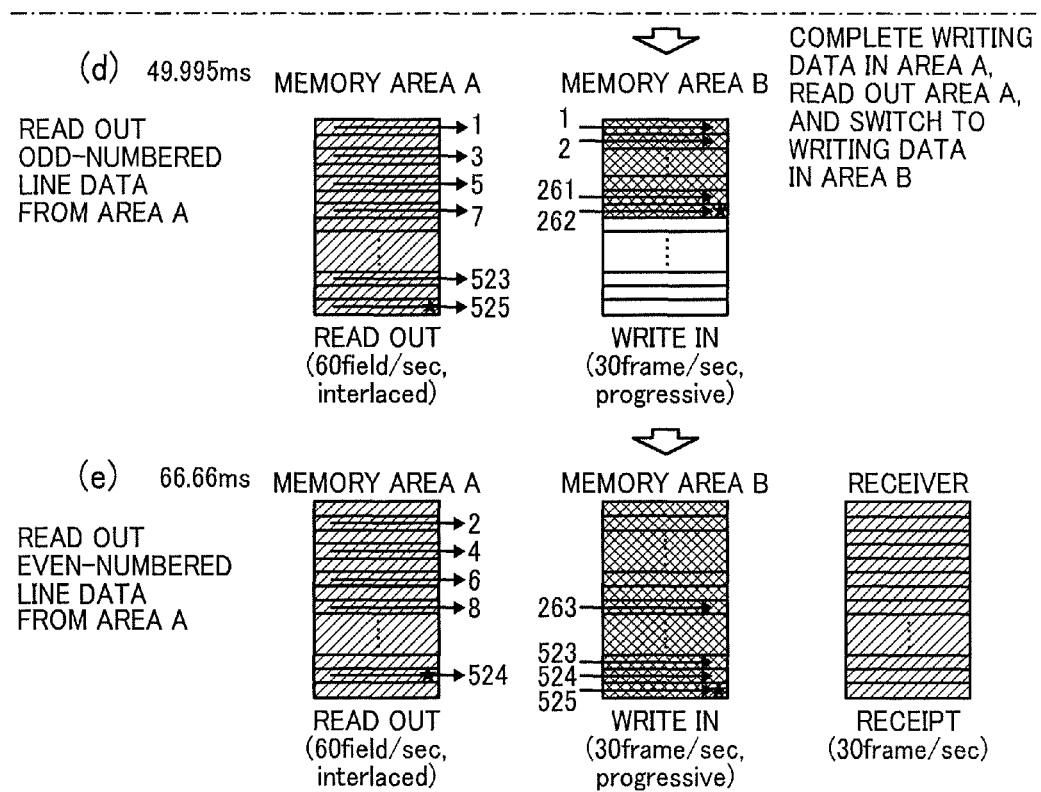

FIG. 9 is a diagram showing a transition of write-in and read-out of the area A and the area B, and a status of an output image (receiver side). The write-in is progressively performed at 30 frames/sec, and the read-out is interlacedly performed at 60 fields/sec. The same pattern in FIG. 9 is image data of the same frame produced fro the imaging element 102. This is the same in the following drawings.

In FIG. 9, since a time for writing in image data of a frame in an area of the frame memory 105 and a time for reading out image data of a frame (odd-numbered field+even-numbered field) are same from another area, once starting writing in and starting reading out is timed, e.g., (a), write-in and read-out eternally end at the same time. Therefore, write-in area and a read-out area can be switched over to each other at a timing of write-in end. For example, when writing in the area A is finished, writing in the area B starts and reading out from the area A starts ((d)). Thus, a frame formed of odd-numbered field and even-numbered field of the same frame can constantly be produced not to generate a comb noise ((c) and (e)).

Next, a case where progressively writing in the frame memory 105 at a frame frequency Ffs out of a frame frequency Ffr of the NTSC system, and interlacedly reading out from the frame memory 105 at the frame frequency Ffr of the NTSC system will be explained. In this case, even when the frame memory 105 is a double buffer, a comb noise is generated.

First, when Ffs is smaller than Ffr, i.e., a case where a time for writing in image data of a frame is longer than a time for reading out image data of a frame will be explained.

Figure 10:
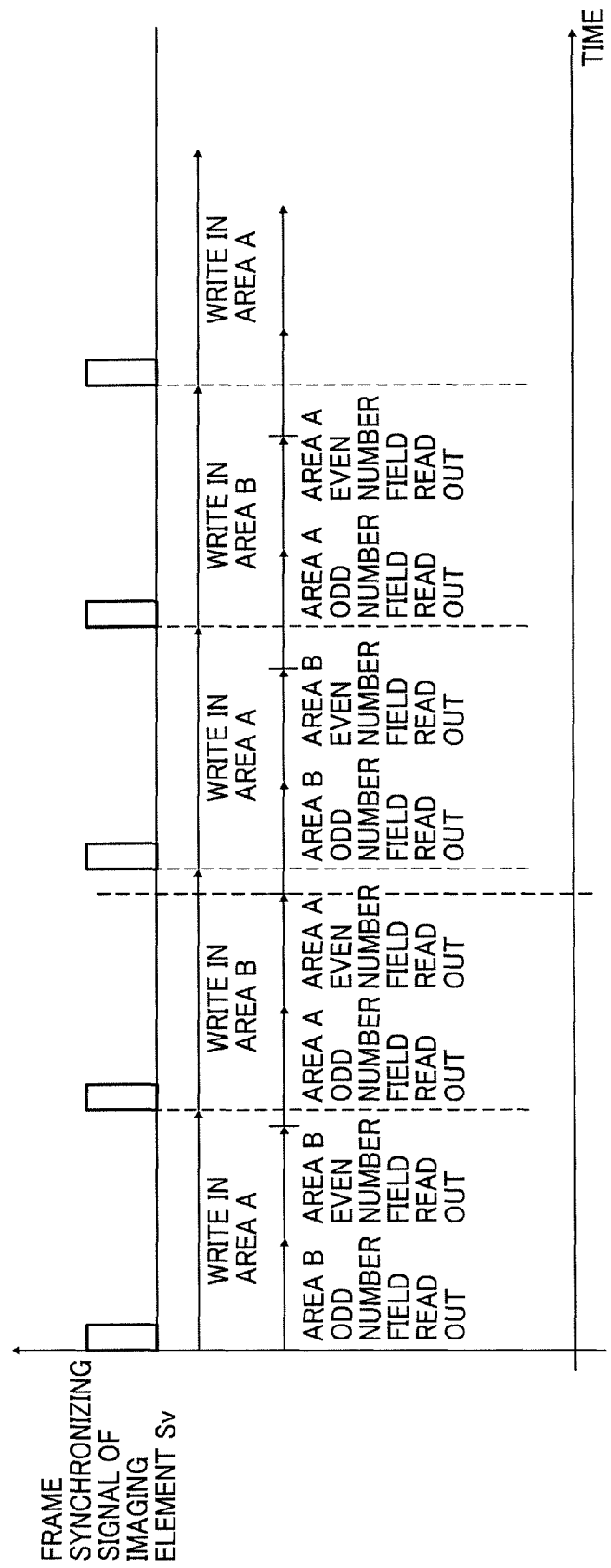
FIG. 10 is a diagram showing a timing of write-in and read-out in a double buffer (write-in time>read-out time)

FIG. 10 is a chart showing timings of writing in and reading out from a double buffer (area A and area B) in this case. Now, pay attention to a dotted line in FIG. 10, i.e., a timing of having finished reading out from the area A. Reading out from the area A is finished, the write-in and the read-out areas are switched, and reading out from the area B and writing in the area A are started. However, at this point, writing in the area B is not finished. Therefore, read-out from the area A is performed again (interlace), and when writing in the area B is finished, the write-in and the read-out areas are switched, and reading out from the area B and writing in the area A are started. In this case, a comb noise in which odd-numbered field lines and even-numbered field lines of different frames are mixed in produced images. This is same even when a relation between the read-out area and the write-in area is reversed.

Figure 11A:
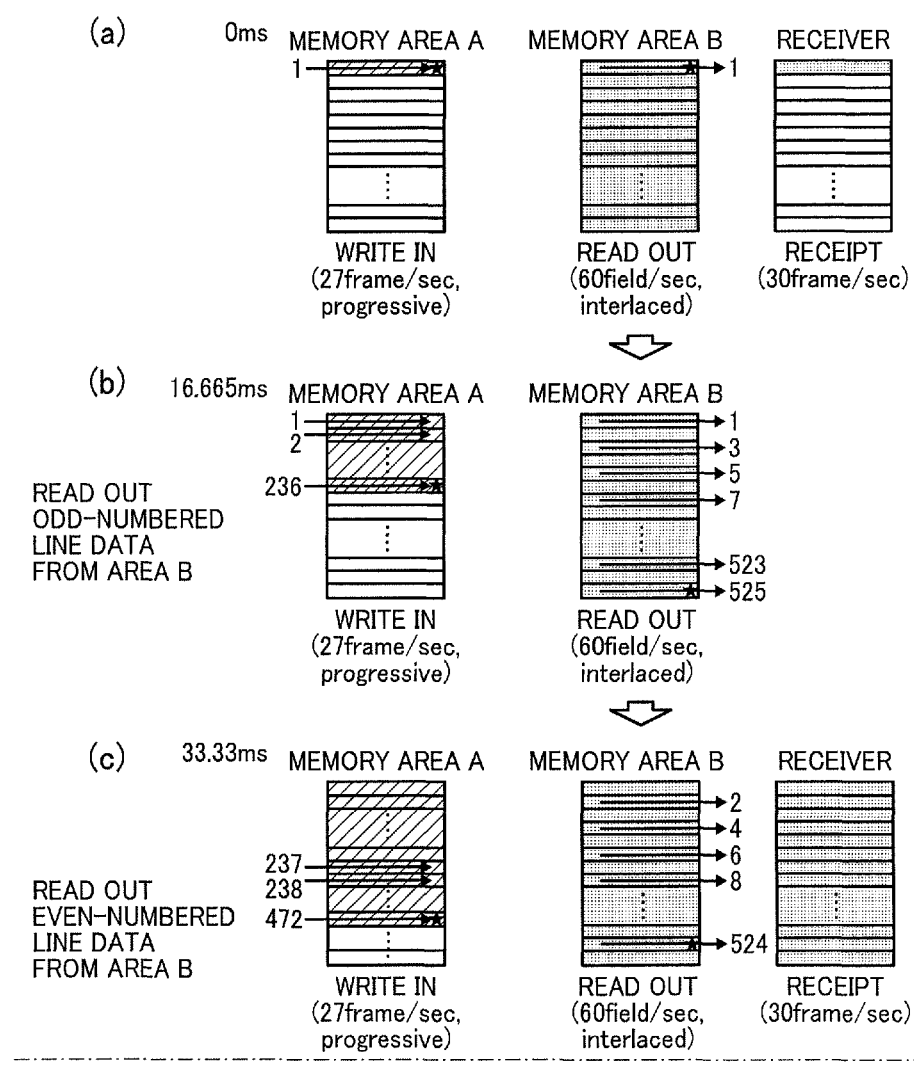
FIG. 11 is a diagram showing a transition of write-in and read-out and a status of an output image in a double buffer (write-in time>read-out time)
Figure 11B:
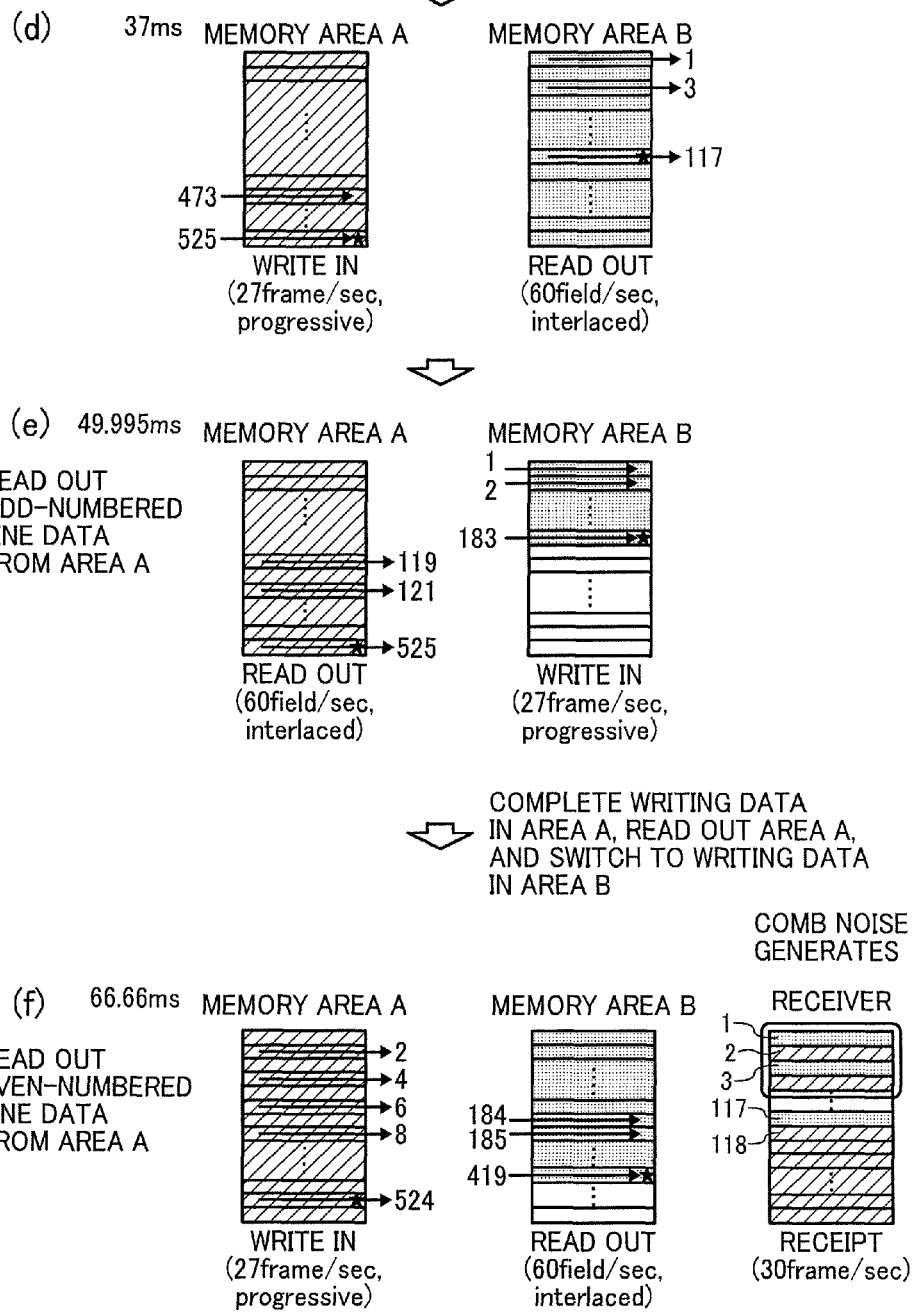

FIG. 11 is a diagram showing a transition of write-in and read-out and a status of an output image (receiver side) in a double buffer (area A and area B) when FfS is smaller than Ffr, i.e., a write-in time of image data of one frame is longer than a read-out time of image data of one frame. In FIG. 11, interlaced read-out of 30 frames/sec for the NTSC system and progressive write-in of 27 frames/sec are used.

Now, progressive writing in the area A started, and at the same time, interlaced reading out from the area B is started (*a*), and pay attention to a point when reading out from the area B is finished (*c*). Then, the area A is still in the middle of being written in. Therefore, reading out from the area B is started again, and at a point when writing in the area A is finished (*d*), the write-in and the read-out areas are switched, and writing in the area B and reading out from the area A and are started. Then, from the area A, interlaced reading out after (*d*) is continuously performed (*e*). As a result, an output image at a point when image data of a frame are read out is (*f*). Namely, a comb noise generates.

Next, when Ffs is larger than Ffr, i.e., a case where a time for writing in image data of a frame is shorter than a time for reading out image data of a frame will be explained.

Figure 12:
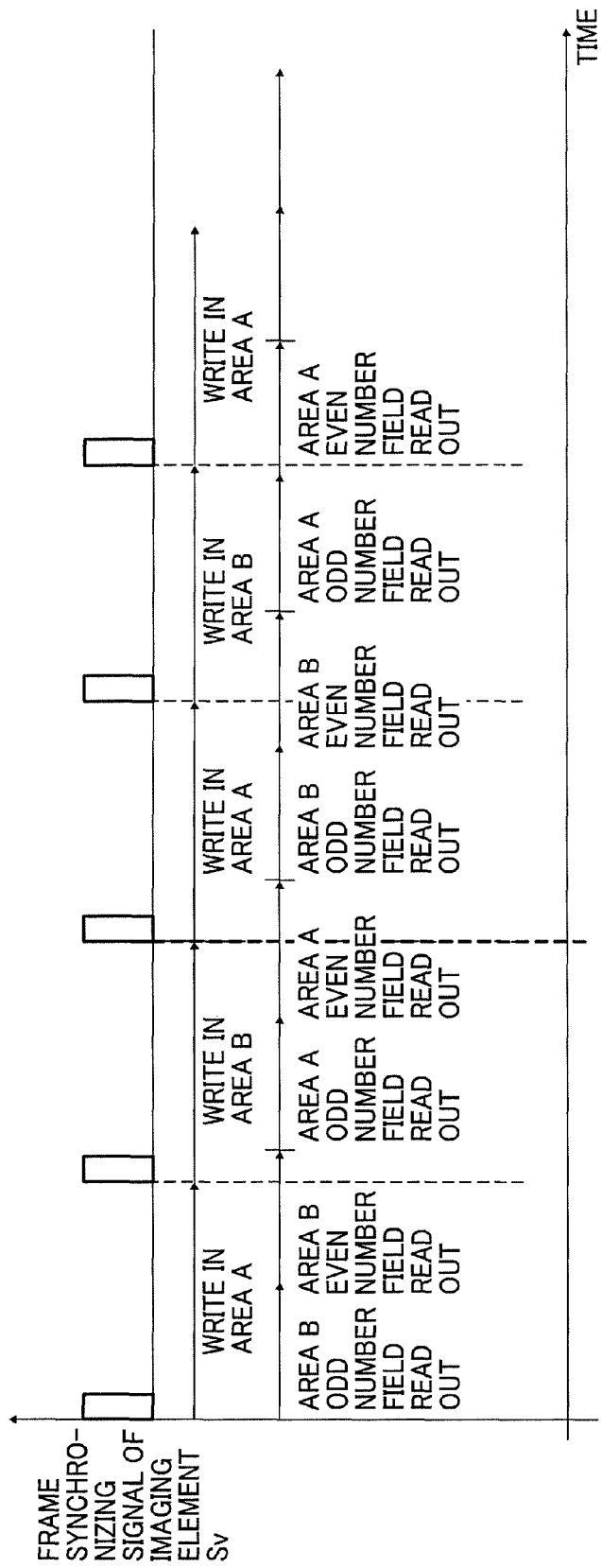
FIG. 12 is a diagram showing a timing of write-in and read-out in a double buffer (write-in time<read-out time)

FIG. 12 is a chart showing timings of writing in and reading out from a double buffer (area A and area B) in this case. Now, pay attention to a dotted line in FIG. 12, i.e., a timing of having finished writing in the area B. Writing in the area B is finished, the write-in and the read-out areas are switched, writing in the area A and reading out from the area B are started. However, at this point, the area A is in the middle of being read out. Then, when the write-in and the read-out areas are switched, a comb noise in which odd-numbered field lines and even-numbered field lines of different frames are mixed in produced images as is the case where Ffs is smaller than Ffr. This is same even when a relation between the read-out area and the write-in area is reversed.

Figure 13:
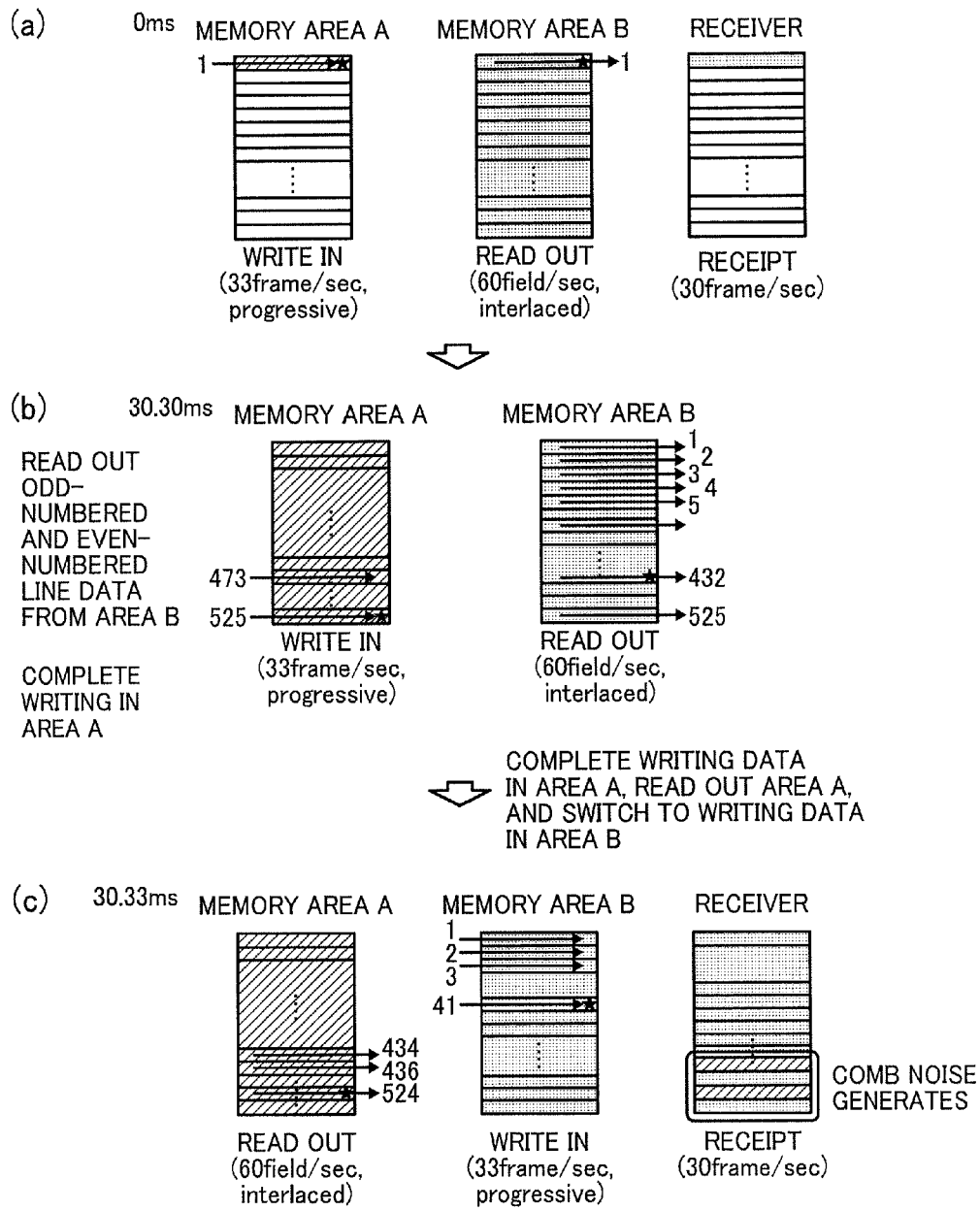
FIG. 13 is a diagram showing a transition of write-in and read-out and a status of an output image in a double buffer (write-in time<read-out time)

FIG. 13 is a diagram showing a transition of write-in and read-out and a status of an output image (receiver side) in a double buffer (area A and area B) when FfS is larger than Ffr, i.e., a write-in time of image data of one frame is shorter than a read-out time of image data of one frame. In FIG. 13, interlaced read-out of 30 frames/sec for the NTSC system and progressive write-in of 33 frames/sec are used.

Now, progressive writing in the area A started, and at the same time, interlaced reading out from the area B is started (*a*), and pay attention to a point when reading out from the area B is finished (*b*). Then, the area B is still in the middle of being readout. Specifically, the odd-numbered fields have been read out, but the even-numbered fields are still being read out.

However, at a point when writing in the area A is finished, the write-in and the read-out areas are switched, and writing in the area B and reading out from the area A and are started. Then, from the area A, interlaced reading out after (*b*) is continuously performed. As a result, an output image at a point when image data of a frame are read out is (*c*). Namely, a comb noise generates.

FIGS. 14(*a*) and 14(*b*) are specific examples of output images. FIG. 14 (*a*) does not have a comb noise, which is formed by driving an imaging element at a frame frequency Ffr of the NTSC system, progressively writing image data produced from the imaging element in the frame memory, and interlacedly reading out from the frame memory with the same frame frequency Ffr of the NTSC system. Meanwhile, FIG. 14 (*b*) has a comb noise, which is formed by driving an imaging element at a frame frequency Ffs out of a frame frequency of the NTSC system (Ffs<Ffr), progressively writing image data produced from the imaging element in the frame memory, and interlacedly reading out from the frame memory at a frequency Ffr of the NTSC system.

The present invent ion prevents a comb noise from generating when taking in image data at a frame frequency Ffs out of a frame frequency of the NTSC system, progressively writing image data produced from the imaging element in the frame memory, and interlacedly reading out from the frame memory at a frequency Ffr of the NTSC system. Hereinafter, the device and configuration will be explained.

In the present invention, the frame memory 105 is divided into at least three areas such as area A, area B and area C (triple buffer), and each area is a write-in area or a read-out area and they are sequentially switched.

Transit of write-in areas is a repetition from area A to area C, area C to area B, and area B to area A. Transit of read-out areas is a repetition from area B (state 1) to area A (state 2), area A to area C (state 3), and area C to area B. However, in the transit from state 1 to state 2, when writing in the area A is not finished, all data in the area B are read out again. In addition, in the transit from state 1 to state 2, when writing in the area A is finished, and further writing in the area C is finished as well, the transit of read-out areas is from state 1 to state 3 skipping state 2. This is the same in transit from state 2 to state 3, and from state 3 to state 1.

Figure 15:
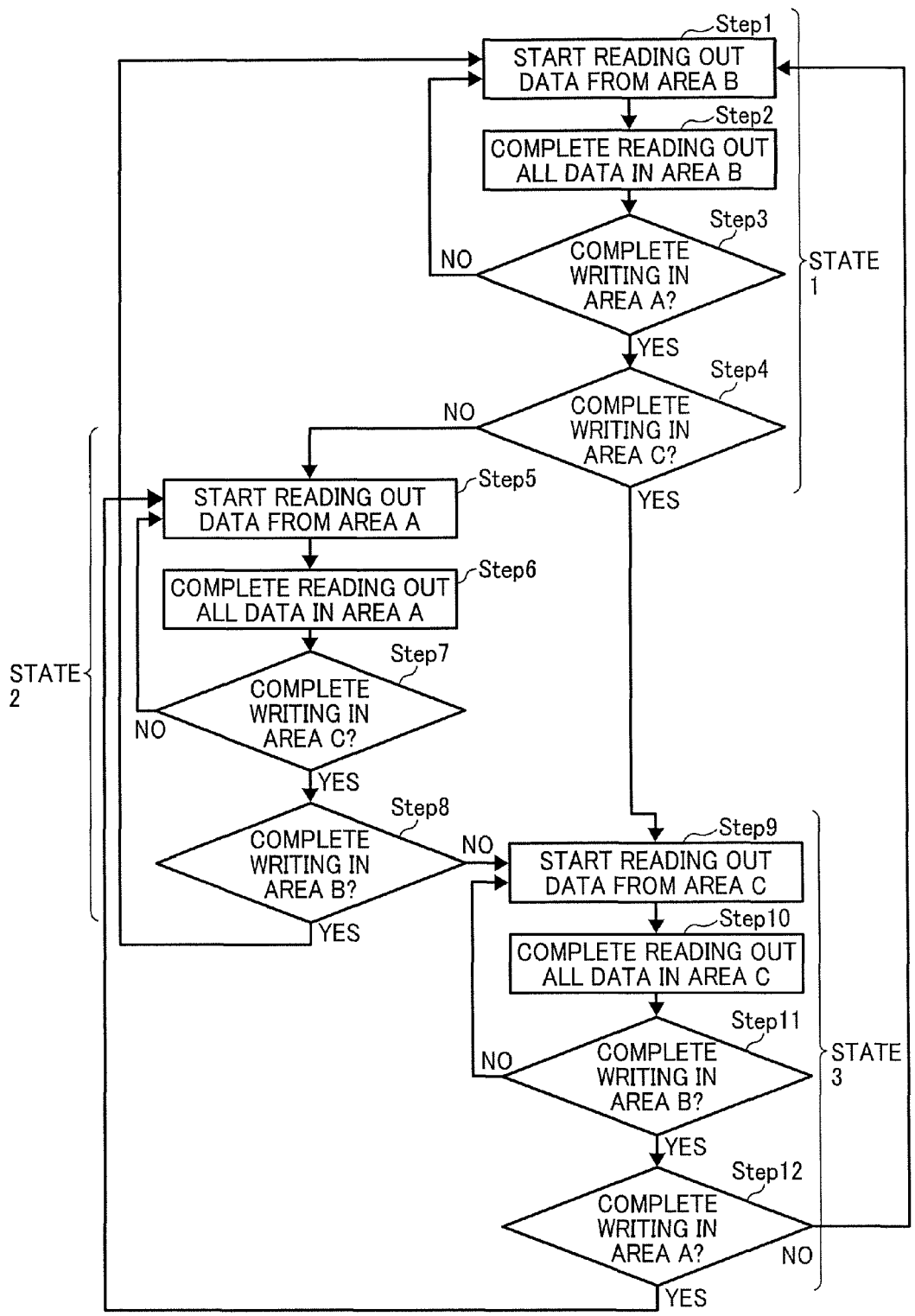
FIG. 15 is flow diagram showing a process of reading out image data in a triple buffer of the present invention

FIG. 15 is flow chart showing a process of reading out image data from the frame memory 105 of the present invention, which has a constitution of a triple buffer. Hereinafter, the state 1 will be explained. State 2 and state 3 are same.

Now, reading out from the area B (interlaced read-out) is started (step 1), when reading out all data from the area B is finished (step 2), whether data write-in in the area A (progressive write-in) is finished (step 3) is checked. When the data write-in in the area A is not finished, all data in the area B are read out again (step 1 and 2), and step 3 again.

When it is verified that the data write-in in the area A is finished in step 3, whether data write-in in the area C (step 4) is checked. When the data write-in in the area C is not finished, it is transited to state 2 to start data reading out from the area A (step 5). When the data write-in in the area C is finished, it is transited to state 3 skipping state 2 to start data reading out from the area C (step 9).

Thus, the frame memory is divided at least areas A, B and C (triple buffer), all data are read out (or read out again) from an area, whether writing in an area to be read out next is finished is checked when the reading out is finished, and reading out area are switched to prevent a comb noise form generating. When reading out from an area is finished, if writing in an area after the next is finished, a reading out area is switched to the area to provide newest image data. The frame memory needs to be at least a triple buffer, and may have four or more memory areas.

The process flow chart in FIG. 15 is applicable to both cases where the write-in time is longer and shorter than the read-out time. The both cases will be explained in detail.

First, the case where the write-in time (cycle) is longer than the read-out time (cycle) will be explained. This is a case where image data are taken in from the imaging element 101 at the frame frequency Ffs lower than the frame frequency Ffr of the NTSC system, progressively written in the frame memory 105, and read out therefrom at the frame frequency Ffr of the NTSC system.

Figure 16:
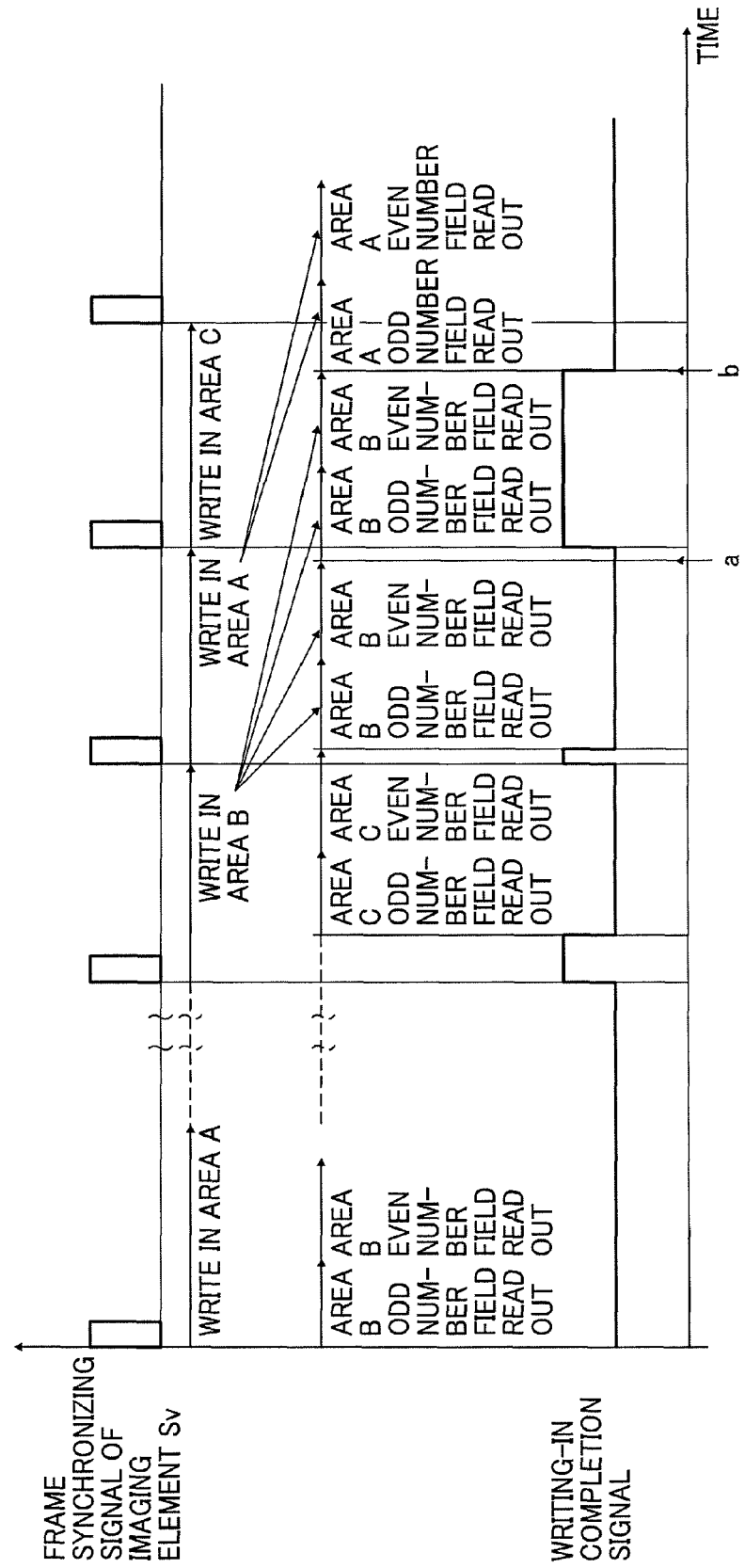
FIG. 16 is a diagram showing a timing of write-in and read-out in the triple buffer (write-in time>read-out time)

FIG. 16 is a chart showing timings of write-in and read-out in the triple buffer (areas A, B and C) in this case. In FIG. 16, Sv is a frame synchronizing signal from the imaging element 102. A write-in completion signal asserts when writing in an area is completed, and negates when starting reading out therefrom.

Now, pay attention to a timing a in FIG. 16. The timing a is a point when data read-out from the area B is finished in the state 1 (step 2 in FIG. 15). According to the process flow in FIG. 15, whether writing data in the area A is completed is verified (step 3 in FIG. 15), the write-in completion signal negates and the writing in the area A is uncompleted. Then, reading out from the area B is started again (step 1 in FIG. 15).

Next, pay attention to a timing b in FIG. 16. The timing b is a point when the second read-out from the area B is finished in the state 1 (step 2 in FIG. 15). According to the process flow in FIG. 15, whether the writing in the area A is completed is verified (step 3 in FIG. 15) again, the write-in completion signal asserts and the writing in the area A is completed. Then, according to the process flow in FIG. 15, whether the writing in the area C is completed is verified (step 4 in FIG. 15), the area C is in the middle of being written in and reading out from the area A is started (step 5 in FIG. 15).

Thus, since data written in the area B are read out twice, the same two images are produced per some frames. A read-out area is not switched until writing in an area to be read out next is finished. Even when a write-in time of one frame is longer than a read-out time thereof of a frame memory, a frame formed of odd-numbered and even-numbered frame images can be produced, and generation of comb noise can be prevented.

FIGS. 17A and 17B is a diagram showing a transition of write-in and read-out and a status of an output image in the triple buffer (areas A, B and C) when the write-in time (cycle) is longer than the read-out time (cycle). In FIGS. 17A and 17B, interlaced read-out of 30 frames/sec for the NTSC system and progressive write-in of 27 frames/sec are used.

Now, pay attention to (e). This is return to state 1 from (a) to (d) after repetition of state 1 to state 3 for several times. (e) represents a status in which reading out all data (one frame) of odd-numbered and even-numbered fields from the area B is finished. Then, the area A is in the middle of being written in. Therefore, reading out from the area B is started again. When reading out (again) from the area B is finished, if writing in the area A is completed and writing in the area C is not completed, reading out from the area A is started (transit to state 2). (g) represents this.

As (e) and (g) in FIG. 17B show, when write-in time is longer than read-out time, the same two frame are produced per some frames, but generation of comb noise can be prevented.

Next, the case where the write-in time (cycle) is shorter than the read-out time (cycle) will be explained. This is a case where image data are taken in from the imaging element 101 at the frame frequency Ffs higher than the frame frequency Ffr of the NTSC system, progressively written in the frame memory 105, and read out therefrom at the frame frequency Ffr of the NTSC system.

Figure 18:
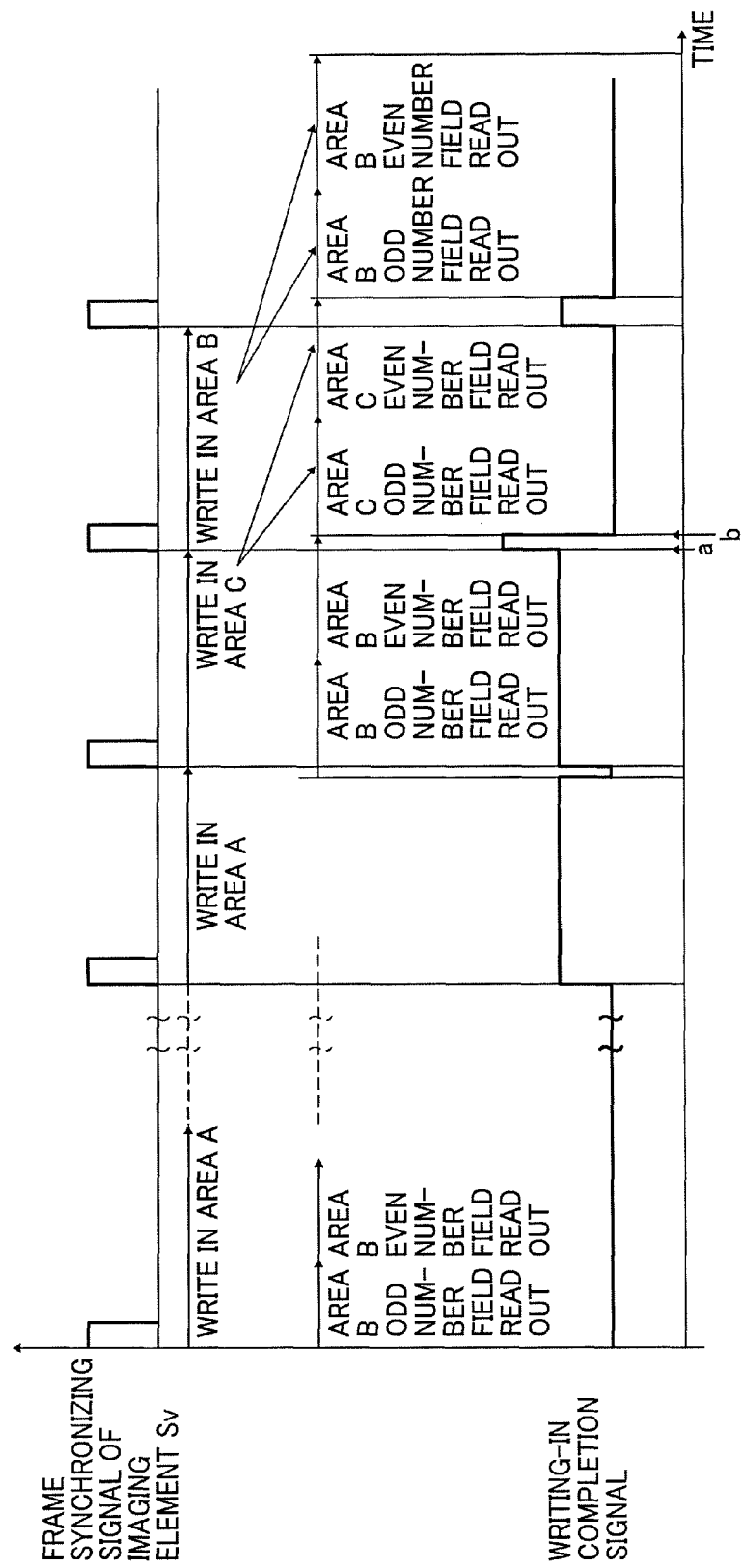
FIG. 18 is a diagram showing a timing of write-in and read-out in the triple buffer (write-in time<read-out time)

FIG. 18 is a chart showing timings of write-in and read-out in the triple buffer (areas A, B and C) in this case. In FIG. 18, Sv is a frame synchronizing signal from the imaging element 102. A write-in completion signal asserts when writing in an area is completed, and negates when starting reading out therefrom.

Now, pay attention to a timing b in FIG. 18. The timing b is a point when data read-out from the area B is finished in the state 1 (step 2 in FIG. 15). According to the process flow in FIG. 15, whether writing data in the area A is completed is verified (step 3 in FIG. 15), and the writing in the area A is completed. Ordinarily, a read-out area is switched to the area A (transit to state 2), but according to the process flow in FIG. 15, whether the writing in the area C is completed is verified (step 4). In FIG. 18, the writing in the area C is completed at the timing a prior to the timing b. Then, the area A is skipped, a read-out area is switched to the area C (transit to state 3), and reading out from the area C is started (step 5 in FIG. 15).

Thus, when the write-in time is shorter than the read-out time, image data are thinned out at a time per some frames, but generation of comb noise can be prevented. In addition, a difference between a frame frequency Ffs taking in image data and a frame frequency Ffr for the NTSC system can be absorbed. Further, since the area C stores image data newer than those of the area A, the area A is skipped and the area C is selected to provide the newest image data.

FIGS. 19A and 19B is a diagram showing a transition of write-in and read-out and a status of an output image in the triple buffer (areas A, B and C) when the write-in time (cycle) is shorter than the read-out time (cycle). In FIGS. 19A and 19B, interlaced read-out of 30 frames/sec for the NTSC system and progressive write-in of 33 frames/sec are used.

Now, pay attention to (d). This is return to state 1 from (a) to (c) after repetition of state 1 to state 3 for several times. (d) represents a status in which reading out all data (one frame) of odd-numbered and even-numbered fields from the area B is finished. Then, writing in the area A is completed (c), and further writing in the area C is completed (d). Then, the area A is skipped and reading out from the area C is started (transit to state 3). (e) represents this. (e) represents a status in which reading out all data (one frame) of odd-numbered and even-numbered fields from the area C is finished, and further a status in which writing in the area B is completed.

As (d) and (e) in FIG. 19B show, when the write-in time is shorter than the read-out time, image data are thinned out at a time per some frames, but generation of comb noise can be prevented.

Figure 20:
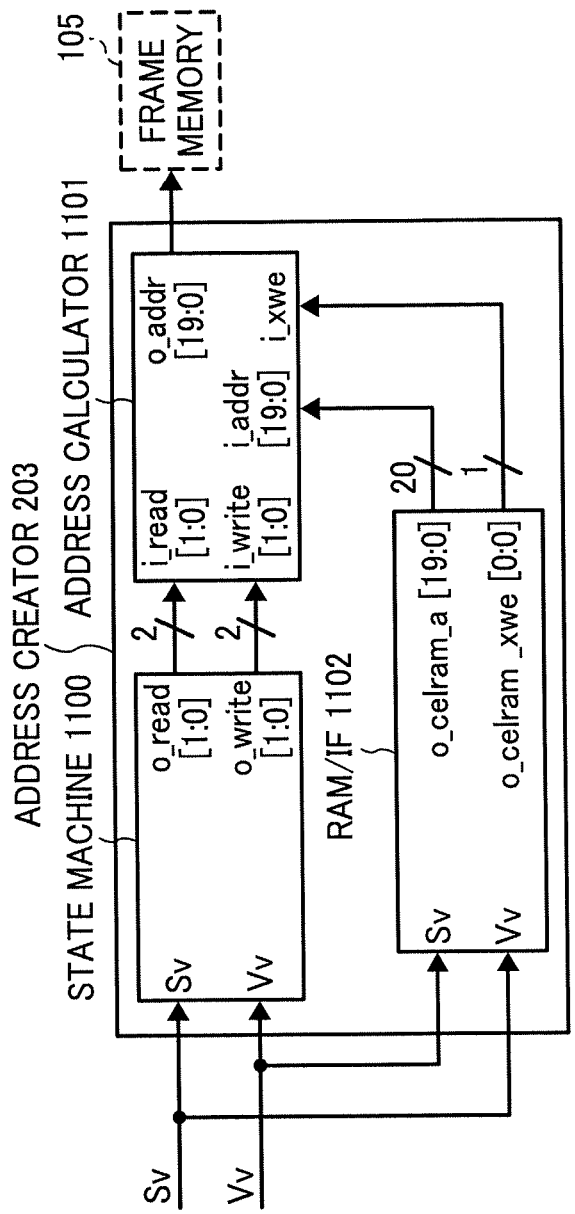
FIG. 20 is a diagram showing a specific mounting example of an address creator in FIG. 4.

The process flow in FIG. 15 is taken care of by the address creator 203 (FIG. 4) in the controller 106 in FIG. 1. FIG. 20 is a diagram showing a specific mounting example of the address creator 203. The address creator 203 has a state machine 1100, an address calculator 1101 and RAM/IF 1102. The address calculator 1101 combines the coordinate calculator 204 in FIG. 4. Sv is a frame synchronizing signal in accordance with the frame frequency Ffs from the imaging element 102. Vv is a frame synchronizing signal in accordance with the frame frequency Ffr of the NYSC system, and is created by the horizontal synchronizing signal creator 202 for output.

Receiving Sv, RAM/IF 1102 sequentially designates a writing address o_calram_a and produces a o_calram_xwe=00. Receiving Vv, RAM/IF 1102 sequentially designates a writing address o_calram$_{13}$ a and produces a=01. o_calram_xwe is a write enable signal (negative logic).

Figure 21:
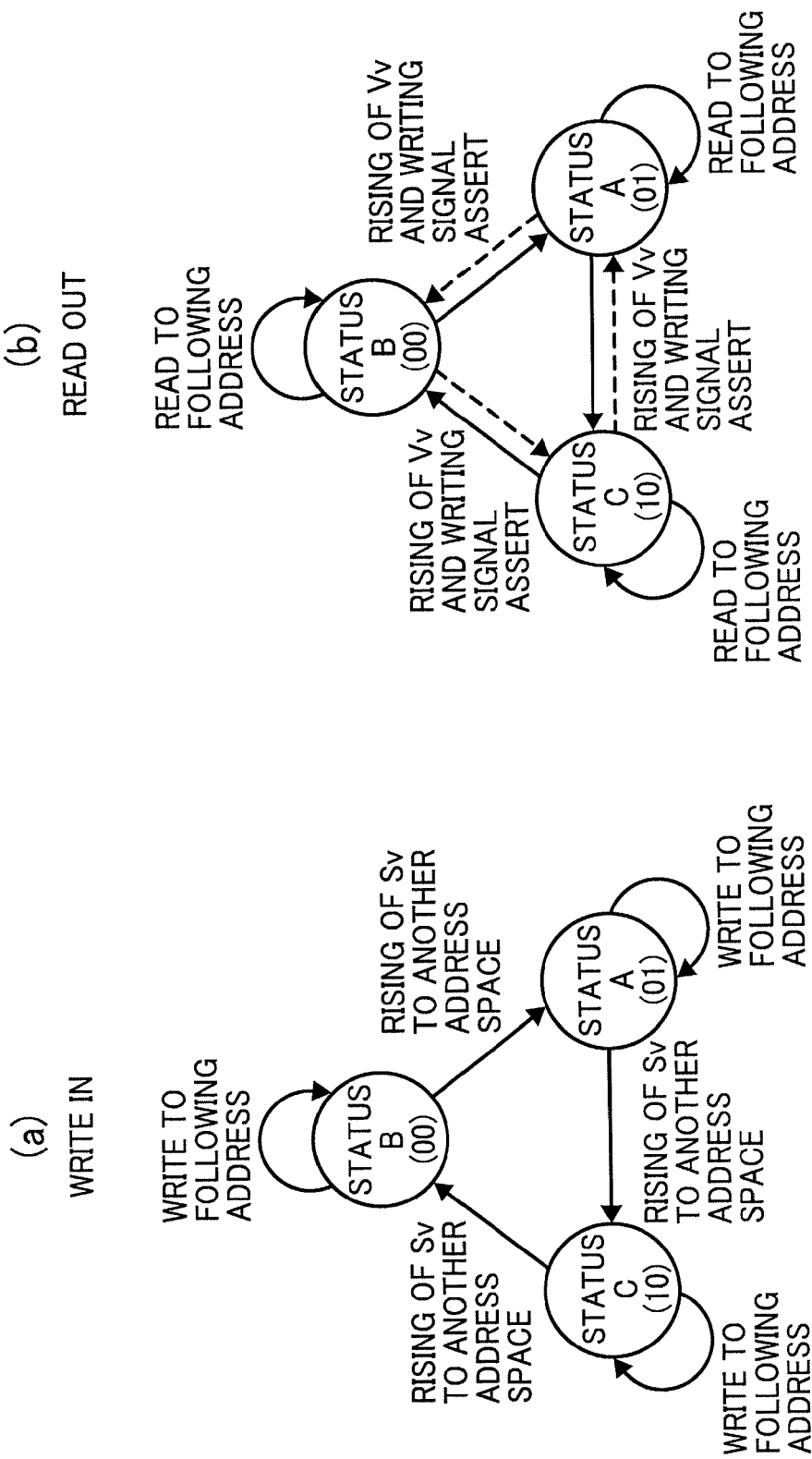
FIG. 21 is a diagram showing a status transition of a state machine in FIG. 20.

The state machine 1100 operates (transits) as shown in FIG. 21. In FIG. 21, (a) is a transition when writing in and (b) is a transition when reading out. In (b), a continuous line represents a write-in completion of the next read-out area (hereinafter referred to as a write-in completion signal 1), and a dotted line represents a write-in completion of the next next read-out area (hereinafter referred to as a write-in completion signal 2).

WRITE transits to the following status with a rise of Sv. Otherwise, it writes data in the following address. For example, in a status B (writing in the area B), it transits to a status A (writing in the area A) with a rise of Sv. An output o_write becomes 00 to 01. Without a rise of Sv, in the status B, it writes data in an address following the area B.

READ transits to the following status if a write-in completion signal asserts when Vv rises. Otherwise, it reads out data from the following address. Having read out all the data, it returns to the first address in the area to sequentially read out data. For example, in a status B (reading out from the area B), it transits to a status A (reading out from the area A) if a write-in completion signal 1 asserts and a write-in completion signal 2 negates when Vv rises. An output o_read becomes 00 to 01. When Vv rises or does not rise, if the write-in completion signal negates, for example, in the status B, it reads out data from an address following the area B. Having read out all the data in the area B, it returns to the first address in the area B to sequentially read out data. In addition, for example, in a status B (reading out from the area B), if the write-in completion signal 1 asserts and the write-in completion signal 2 negates as well when Vv rises, it transits to a status C (reading out from the area C). An output o_read becomes 00 to 10.

The address calculator 1101 operates according to the Table of Truth Value in FIG. 22. It receives i_write and i_read from the state machine 1100, and i_addr and i_xwe from the RAM/IF 1102. i_write shows which area to write in, i_read shows which area to read out from, i_addr is an address of memory, and i_xwe designates write-in/read-out to the memory. As FIG. 22 shows, according to an area i_write and i_read designate, i_addr is arranged to designate an address of the frame memory 105.

Figure 23:
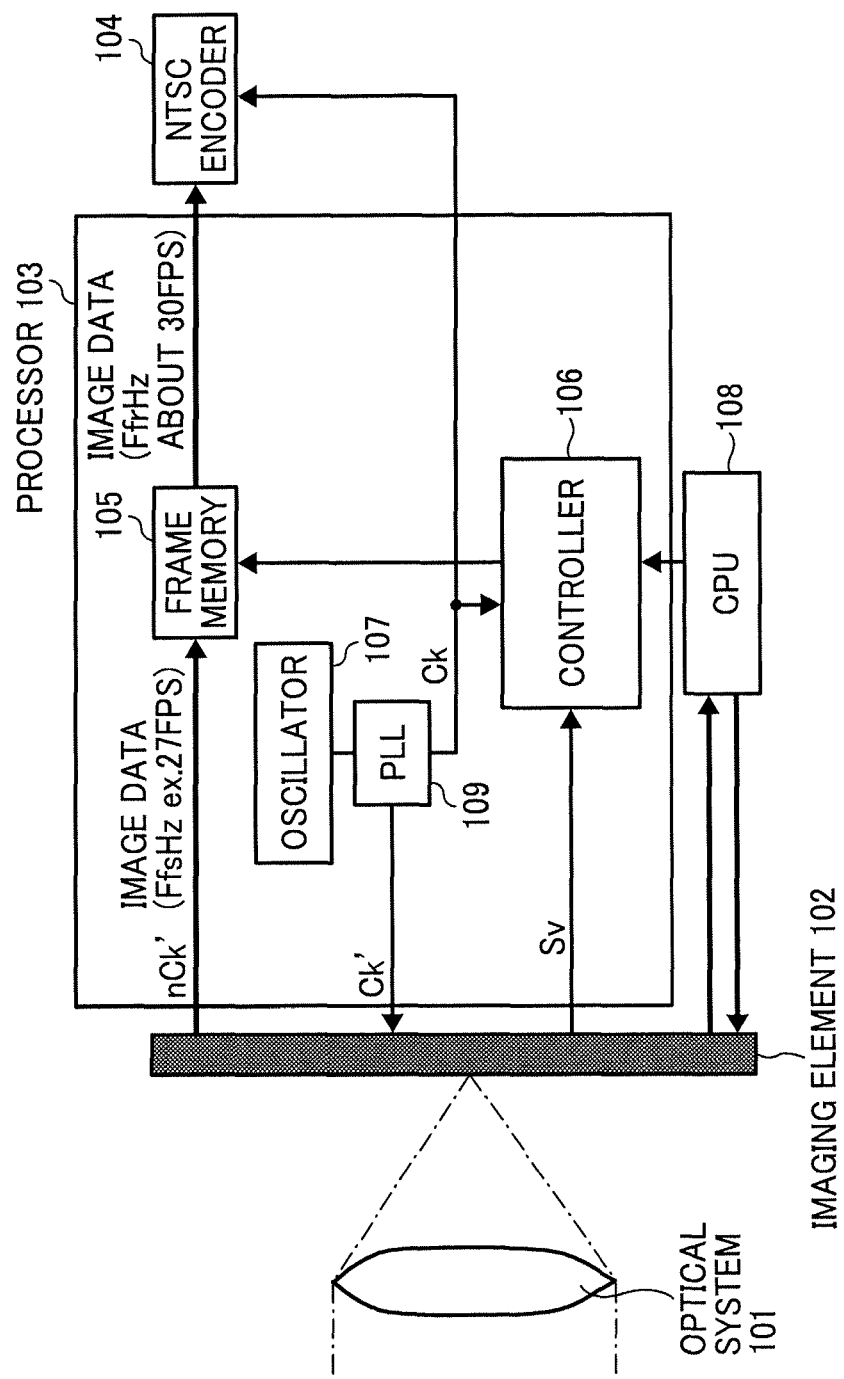
FIG. 23 is a whole configuration diagram of another embodiment of the imaging apparatus of the present invention.

FIG. 23 is a whole configuration diagram of another embodiment (Embodiment 2) of the imaging apparatus of the present invention. The imaging apparatus includes an optical system 101, an imaging element 102, a processor 103, an NTSC encoder 104, a CPU 108 controlling the all operations, etc. The processor 103 includes a frame memory 105, a controller 106, an oscillator 107 and a PLL 109. The NTSC encoder 104 is connected with a display device and an image recorder of the NTSC system, but they are omitted in FIG. 23. The oscillator 107 is a crystal element generating a clock signal for the NTSC system. The PLL 109 produces a clock frequency CK (13.5 MHz) for the NTSC system as it is when receiving it from the oscillator 107, and at the same time, and forms a clock frequency CK' out of the clock frequency CK (13.5 MHz) for the NTSC system. A chip including the controller includes the PLL 109 as well, and new components are not needed and the configuration if FIG. 23 can be realized without consideration of the cost and a space for a substrate.

The clock frequency CK (13.5 MHz) for the NTSC system from the PLL 109 is given to the controller 106 in the processor 103 and the NTSC encoder as well. The clock frequency CK' out of the clock frequency CK for the NTSC system is given to the imaging element 102. The smaller the clock frequency, the more effective to EMC. Therefore, the clock frequency CK' is preferably lower than the clock frequency CK. For example, CK' has a frequency of 12.65625 MHz.

The imaging element 102 receives the clock frequency CK' out of the clock frequency CK for the NTSC system from the PLL 109 and converts it into an n-times frequency with a PLL (not shown) in the imaging element 102. Hereinafter, the frequency after converted is a sensor output clock frequency. For example, when n is 2, the sensor output clock frequency is 25.3125 MHz. Compared the sensor output clock frequency 25.3125 MHz of this embodiment with an ordinary sensor output clock frequency 27 MHz of the NTSC, the sensor output clock frequency 25.3125 MHz of this embodiment is lower and effective to EMC. In addition, the sensor output clock frequency not having a common divisor or a common multiple of the ordinary sensor output clock frequency 27 MHz of the NTSC is effective to EMC as well. The imaging element 102 progressively reads out image data imaged through the optical system 101 at the frame frequency Ffs, e.g., 27 FPS which is offset by a predetermined offset frequency relative to the frame frequency Ffr (about 30 FPS) of the NTSC system, and transmits the image data to the processor 103.

As mentioned in Embodiment 1, the imaging element 102 has a register (sensor register) and changes a blanking period in a vertical direction or a blanking period in a horizontal direction according to a parameter value set by the CPU 108 in the register such that the frame frequency of image data becomes Ffs, e.g., 27 FPS. The imaging element 102 transmits a frame synchronizing signal Sv of the frame frequency Ffs to the processor 103 as well as the image data. The operation of the processor 103 is same as that of Embodiment 1 and an explanation thereof is omitted.

This application claims priority and contains subject matter related to Japanese Patent Applications Nos. 2009-282989, 2010-203581 and 2009-273776 filed on Dec. 14, 2009, Sep. 10, 2010 and Dec. 1, 2009, respectively, the entire contents of each of which are hereby incorporated by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. An imaging apparatus, comprising:
   an optical system configured to form an optical image of an object;
   an imaging element configured to image the optical image and produce image data at a frame frequency (Ffs) out of a frame frequency (Ffr) of NTSC system;
   a frame memory configured to store the image data; and
   a controller configured to progressively write the image data in the frame memory and interlacedly read out the image data from the frame memory at the frame frequency (Ffr) of NTSC system,
   wherein the frame memory is divided into at least three areas, and each of the at least three areas of the frame memory comprises a writing-in area and a read-out area, and
   wherein the controller sequentially switches between operating the writing-in and read-out areas of the at least three areas of the frame memory and progressively writes one frame of image data in each area and interlacedly reads out one frame of image data from each area in sequence, by determining whether writing one frame of image data in an area after an area the controller reads out next is completed when finishing reading out one frame of image data from an area the controller reads out next, and reading out image data from the area the controller reads out next when the writing is not completed, or skipping the area the controller reads out next and starting a read-out of image data from the area after an area the controller reads out next when the writing is completed.

2. The imaging apparatus of claim 1, wherein the controller determines whether writing one frame of image data in an area the controller reads out next is completed when finishing reading out one frame of image data from an area, and reads out again one frame of image data from the area the controller has read out when not completed.

3. The imaging apparatus of claim 1, wherein the controller performs a predetermined image conversion process when reading out image data from the frame memory.

4. The imaging apparatus of claim 1, wherein the imaging element produces image data at a frame frequency (Ffs) having a constant frame cycle.

5. The imaging apparatus of claim 1, wherein the imaging element produces image data at a frame frequency (Ffs) having variable adjacent frame cycles and a frame cycle of NTSC system when averaged.

6. The imaging apparatus of claim 1, further comprising a single oscillator configured to generate a clock frequency of NTSC system,
wherein the controller controls the interlaced read-out from the frame memory at the frame frequency (Ffr) of NTSC system, based on a clock of the clock frequency for NTSC system from the oscillator, and
wherein the imaging element operates, receiving the clock of the clock frequency of NTSC system, and changes a blanking period in a vertical direction or a blanking period in a horizontal direction to produce image data at the frame frequency (Ffs) out of the frame frequency (Ffr) of NTSC system.

7. The imaging apparatus of claim 6, wherein the imaging element comprises a register configured to register a parameter value, and changes the blanking period in a vertical direction or the blanking period in a horizontal direction according to the parameter value.

8. The imaging apparatus of claim 7, further comprising a CPU configured to determine the parameter value of the register in the imaging element.

9. The imaging apparatus of claim 1, further comprising:
a single oscillator configured to generate a clock frequency of NTSC system,
wherein the controller controls the interlaced read-out from the frame memory at the frame frequency (Ffr) of NTSC system, based on a clock of the clock frequency for of NTSC system from the oscillator, and
wherein the imaging element operates, receiving the clock of the clock frequency of NTSC system.

10. The imaging apparatus of claim 9, wherein the imaging element converts the clock of the clock frequency of NTSC system into a clock having a n-times frequency with a PLL and produces image data at the converted clock frequency.

11. The imaging apparatus of claim 10, wherein the clock and the converted clock are not a common divisor or a common multiple of the clock frequency of NTSC system.

12. The imaging apparatus of claim 11, wherein the imaging element changes a blanking period in a vertical direction or a blanking period in a horizontal direction to produce image data at the frame frequency (Ffs) out of the frame frequency (Ffr) of NTSC system.

13. The imaging apparatus of claim 1, wherein the imaging element produces a frame synchronizing signal of the frame frequency (Ffr) together with image data, and
wherein the controller controls a read-out timing of the frame memory based on the frame synchronizing signal from the imaging element.

14. The imaging apparatus of claim 1, wherein the frame frequency (Ffs) is smaller than the frame frequency (Ffr) of NTSC system.

15. The imaging apparatus of claim 7, wherein the parameter value may be set such that the frame frequency (Ffs) is smaller than the frame frequency (Ffr) of NTSC system or wherein the frame frequency (Ffs) is larger than the frame frequency (Ffr) of NTSC system.

16. The imaging apparatus of claim 13, wherein the frame synchronizing signal comprises at least one of a vertical synchronizing signal and a horizontal synchronizing signal.

* * * * *